(12) United States Patent
Brown et al.

(10) Patent No.: US 11,719,463 B2
(45) Date of Patent: Aug. 8, 2023

(54) FILM DOOR BELT FLUID FLOW CONTROL SYSTEM

(71) Applicant: DENSO International America, Inc., Southfield, MI (US)

(72) Inventors: Keniel Brown, Ferndale, MI (US); Adam Gilley, Detroit, MI (US); Preston Moore, Farmington Hills, MI (US)

(73) Assignee: DENSO International America, Inc., Southfield, MI (US)

( * ) Notice: Subject to any disclaimer, the term of this patent is extended or adjusted under 35 U.S.C. 154(b) by 403 days.

(21) Appl. No.: 17/001,272

(22) Filed: Aug. 24, 2020

(65) Prior Publication Data

US 2022/0057106 A1    Feb. 24, 2022

(51) Int. Cl.
| | |
|---|---|
| *F24F 13/14* | (2006.01) |
| *F24F 110/00* | (2018.01) |
| *F24F 140/40* | (2018.01) |
| *F24F 11/00* | (2018.01) |
| *B60H 1/00* | (2006.01) |

(52) U.S. Cl.
CPC ...... *F24F 13/1413* (2013.01); *F24F 13/1426* (2013.01); *B60H 2001/00728* (2013.01); *F24F 2011/0002* (2013.01); *F24F 2013/1433* (2013.01); *F24F 2110/00* (2018.01); *F24F 2140/40* (2018.01)

(58) Field of Classification Search
CPC ............... F24F 13/1413; F24F 13/1426; F24F 13/0236; F24F 2013/1433; F24F 2011/0002; F24F 2110/00; F24F 2140/40; B60H 2011/00728
USPC .......................................................... 454/239
See application file for complete search history.

(56) References Cited

U.S. PATENT DOCUMENTS

| | | | |
|---|---|---|---|
| 5,653,630 | A | 8/1997 | Higashihara |
| 6,045,444 | A | 4/2000 | Zima et al. |
| 6,074,294 | A | 6/2000 | Stevenson |
| 6,211,630 | B1 | 4/2001 | Enzinna |
| 6,378,222 | B1 * | 4/2002 | Enzinna ............. B60H 1/00692 33/645 |

FOREIGN PATENT DOCUMENTS

| | | | | |
|---|---|---|---|---|
| EP | 1 118 481 A1 | 7/2001 | | |
| KR | 521394 B1 * | 12/2005 | ............... | B60H 1/26 |
| KR | 739467 B1 * | 7/2007 | ............... | B60H 1/00 |

* cited by examiner

*Primary Examiner* — Allen R. B. Schult
(74) *Attorney, Agent, or Firm* — Harness, Dickey & Pierce, P.L.C.

(57) ABSTRACT

A Fluid Flow Control System (FFCS) door assembly includes a continuous belt and a plurality of rollers. The plurality of rollers support the continuous belt and define a first segment, a second segment, a third segment, and a fourth segment. The continuous belt includes a plurality of openings that selectively allow fluid flow to pass through the first segment, the second segment, the third segment, and the fourth segment when two openings of the plurality of openings align with the first segment, the second segment, the third segment, or the fourth segment.

18 Claims, 42 Drawing Sheets

FIG-13

4 Mode 1s * 4 Mode 2s * 2 Mode 3s
Total = 32 Mode Combos

| 1A + 2A + 3A | 1A + 2A + 3B |
| 1B + 2A + 3A | 1B + 2A + 3B |
| 1C + 2A + 3A | 1C + 2A + 3B |
| 1D + 2A + 3A | 1D + 2A + 3B |
| 1A + 2B + 3A | 1A + 2B + 3B |
| 1B + 2B + 3A | 1B + 2B + 3B |
| 1C + 2B + 3A | 1C + 2B + 3B |
| 1D + 2B + 3A | 1D + 2B + 3B |
| 1A + 2C + 3A | 1A + 2C + 3B |
| 1B + 2C + 3A | 1B + 2C + 3B |
| 1C + 2C + 3A | 1C + 2C + 3B |
| 1D + 2C + 3A | 1D + 2C + 3B |
| 1A + 2D + 3A | 1A + 2D + 3B |
| 1B + 2D + 3A | 1B + 2D + 3B |
| 1C + 2D + 3A | 1C + 2D + 3B |
| 1D + 2D + 3A | 1D + 2D + 3B |

$$O = \sum_{\alpha=1}^{\omega-1} \sum_{\beta=\alpha+1}^{\omega} \sum_{x=0}^{L} (f_\alpha(x + C_\alpha) * f_\beta(x + C_\beta) * |f_\alpha(x + C_\alpha) - f_\beta(x + C_\beta)|)$$

| x | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| 1A | -1 | 1 | 1 | 0 | -1 | -1 | 0 | -1 | -1 | 1 | 1 | 0 | -1 | -1 | 0 | -1 |
| 1B | -1 | 0 | 1 | 0 | -1 | -1 | 1 | -1 | -1 | 1 | 1 | 0 | -1 | -1 | 1 | -1 |
| 1C | -1 | 1 | 0 | 1 | -1 | -1 | 0 | -1 | -1 | 0 | 0 | 1 | -1 | -1 | 0 | -1 |
| 1D | -1 | 0 | 0 | 1 | -1 | -1 | 1 | -1 | -1 | 0 | 0 | 1 | -1 | -1 | 1 | -1 |
| 2A | -1 | 1 | -1 | -1 | 0 | 1 | 0 | -1 | -1 | 1 | -1 | -1 | 0 | 1 | 0 | -1 |
| 2B | -1 | 0 | -1 | -1 | 0 | 1 | 1 | -1 | -1 | 0 | -1 | -1 | 0 | 1 | 1 | -1 |
| 2C | -1 | 1 | -1 | -1 | 1 | 0 | 0 | -1 | -1 | 1 | -1 | -1 | 1 | 0 | 0 | -1 |
| 2D | -1 | 0 | -1 | -1 | 1 | 0 | 1 | -1 | -1 | 0 | -1 | -1 | 1 | 0 | 1 | -1 |
| 3A | 1 | -1 | -1 | -1 | 0 | 0 | -1 | 0 | 1 | -1 | -1 | -1 | 0 | 0 | -1 | 0 |
| 3B | 0 | -1 | -1 | -1 | 0 | 0 | -1 | 1 | 0 | -1 | -1 | -1 | 0 | 0 | -1 | 1 |

$$0 = \sum_{\alpha=1}^{\omega-1} \sum_{\beta=\alpha+1}^{\omega} \sum_{x=0}^{L} (f_\alpha(x+C_\alpha) * f_\beta(x+C_\beta) * |f_\alpha(x+C_\alpha) - f_\beta(x+C_\beta)|)$$

$$0 = \sum_{x=0}^{12} (f_1(x) * f_2(x) * |f_1(x) - f_2(x)|)$$

$\omega = 2, n = 12, C_\alpha = 0, C_\beta = 0$

| | | | | | |
|---|---|---|---|---|---|
| $f_\alpha(1)*f_\beta(1)*\|f_\alpha(1)-f_\beta(1)\|$ | = | -1 * | -1 * | (-1) - (-1) | = 0 |
| $f_\alpha(2)*f_\beta(2)*\|f_\alpha(2)-f_\beta(2)\|$ | = | 0 * | -1 * | (0) - (-1) | = 0 |
| $f_\alpha(3)*f_\beta(3)*\|f_\alpha(3)-f_\beta(3)\|$ | = | -1 * | 0 * | (-1) - (0) | = 0 |
| $f_\alpha(4)*f_\beta(4)*\|f_\alpha(4)-f_\beta(4)\|$ | = | 0 * | 0 * | (0) - (0) | = 0 |
| $f_\alpha(5)*f_\beta(5)*\|f_\alpha(5)-f_\beta(5)\|$ | = | -1 * | 0 * | (-1) - (0) | = 0 |
| $f_\alpha(6)*f_\beta(6)*\|f_\alpha(6)-f_\beta(6)\|$ | = | 0 * | -1 * | (0) - (-1) | = 0 |
| $f_\alpha(7)*f_\beta(7)*\|f_\alpha(7)-f_\beta(7)\|$ | = | 0 * | 0 * | (0) - (0) | = 0 |
| $f_\alpha(8)*f_\beta(8)*\|f_\alpha(8)-f_\beta(8)\|$ | = | 1 * | 0 * | (1) - (0) | = 0 |
| $f_\alpha(9)*f_\beta(9)*\|f_\alpha(9)-f_\beta(9)\|$ | = | 1 * | 1 * | (1) - (1) | = 0 |
| $f_\alpha(10)*f_\beta(10)*\|f_\alpha(10)-f_\beta(10)\|$ | = | 0 * | 1 * | (0) - (1) | = 0 |
| $f_\alpha(11)*f_\beta(11)*\|f_\alpha(11)-f_\beta(11)\|$ | = | 0 * | 0 * | (0) - (0) | = 0 |
| $f_\alpha(12)*f_\beta(12)*\|f_\alpha(12)-f_\beta(12)\|$ | = | 1 * | 1 * | (1) - (1) | = 0 |
| $+ f_\alpha(x)*f_\beta(x)*\|f_\alpha(x)-f_\beta(x)\|$ | = | | | | = 0 |

FIG-15

$\omega = 2, n = 12, C_\alpha = 0, C_\beta = 0$ $0 = \sum_{\alpha=1}^{\omega-1} \sum_{\beta=\alpha+1}^{\omega} \sum_{x=0}^{L} (f_\alpha(x+C_\alpha) * f_\beta(x+C_\beta) * |f_\alpha(x+C_\alpha) - f_\beta(x+C_\beta)|)$ $0 = \sum_{x=0}^{12} (f_1(x) * f_2(x) * |f_1(x) - f_2(x)|)$

| | | | | | | | |
|---|---|---|---|---|---|---|---|
| $f_\alpha(1) * f_\beta(1) * \|f_\alpha(1) - f_\beta(1)\|$ | = | 0 * 0 * | (0) - (0) | = | 0 |
| $f_\alpha(2) * f_\beta(2) * \|f_\alpha(2) - f_\beta(2)\|$ | = | -1 * 1 * | (-1) - (1) | = | -2 |
| $f_\alpha(3) * f_\beta(3) * \|f_\alpha(3) - f_\beta(3)\|$ | = | -1 * 1 * | (-1) - (1) | = | -2 |
| $f_\alpha(4) * f_\beta(4) * \|f_\alpha(4) - f_\beta(4)\|$ | = | 0 * 0 * | (0) - (0) | = | 0 |
| $f_\alpha(5) * f_\beta(5) * \|f_\alpha(5) - f_\beta(5)\|$ | = | 0 * 0 * | (0) - (0) | = | 0 |
| $f_\alpha(6) * f_\beta(6) * \|f_\alpha(6) - f_\beta(6)\|$ | = | 1 * 0 * | (1) - (0) | = | 0 |
| $f_\alpha(7) * f_\beta(7) * \|f_\alpha(7) - f_\beta(7)\|$ | = | 1 * 0 * | (1) - (0) | = | 0 |
| $f_\alpha(8) * f_\beta(8) * \|f_\alpha(8) - f_\beta(8)\|$ | = | 0 * 0 * | (0) - (0) | = | 0 |
| $f_\alpha(9) * f_\beta(9) * \|f_\alpha(9) - f_\beta(9)\|$ | = | 0 * 0 * | (0) - (0) | = | 0 |
| $f_\alpha(10) * f_\beta(10) * \|f_\alpha(10) - f_\beta(10)\|$ | = | -1 * 1 * | (-1) - (1) | = | -2 |
| $f_\alpha(11) * f_\beta(11) * \|f_\alpha(11) - f_\beta(11)\|$ | = | -1 * 1 * | (-1) - (1) | = | -2 |
| $f_\alpha(12) * f_\beta(12) * \|f_\alpha(12) - f_\beta(12)\|$ | = | 0 * 0 * | (0) - (0) | = | 0 |
| $+ f_\alpha(x) * f_\beta(x) * \|f_\alpha(x) - f_\beta(x)\|$ | | | | = | -8 |
| | | | | = | -8 |

$$0 = \sum_{\alpha=1}^{\omega-1} \sum_{\beta=\alpha+1}^{\omega} \sum_{x=0}^{L} (f_\alpha(x+C_\alpha) * f_\beta(x+C_\beta) * |f_\alpha(x+C_\alpha) - f_\beta(x+C_\beta)|)$$

$$0 = \sum_{x=0}^{12} (f_1(x) * f_2(x+2) * |f_1(x) - f_2(x+2)|)$$

| | | | | |
|---|---|---|---|---|
| $f_\alpha(1)*f_\beta(3)*$ | $\|f_\alpha(1)-f_\beta(3)\|$ | $= 0 * 1 *$ | $\|(0) - (1)\|$ | $= 0$ |
| $f_\alpha(2)*f_\beta(4)*$ | $\|f_\alpha(2)-f_\beta(4)\|$ | $= -1 * 0 *$ | $\|(-1) - (0)\|$ | $= 0$ |
| $f_\alpha(3)*f_\beta(5)*$ | $\|f_\alpha(3)-f_\beta(5)\|$ | $= -1 * 0 *$ | $\|(-1) - (0)\|$ | $= 0$ |
| $f_\alpha(4)*f_\beta(6)*$ | $\|f_\alpha(4)-f_\beta(6)\|$ | $= 0 * 0 *$ | $\|(0) - (0)\|$ | $= 0$ |
| $f_\alpha(5)*f_\beta(7)*$ | $\|f_\alpha(5)-f_\beta(7)\|$ | $= 0 * 0 *$ | $\|(0) - (0)\|$ | $= 0$ |
| $f_\alpha(6)*f_\beta(8)*$ | $\|f_\alpha(6)-f_\beta(8)\|$ | $= 1 * 0 *$ | $\|(1) - (0)\|$ | $= 0$ |
| $f_\alpha(7)*f_\beta(9)*$ | $\|f_\alpha(7)-f_\beta(9)\|$ | $= 1 * 0 *$ | $\|(1) - (0)\|$ | $= 0$ |
| $f_\alpha(8)*f_\beta(10)*$ | $\|f_\alpha(8)-f_\beta(10)\|$ | $= 0 * 1 *$ | $\|(0) - (1)\|$ | $= 0$ |
| $f_\alpha(9)*f_\beta(11)*$ | $\|f_\alpha(9)-f_\beta(11)\|$ | $= 0 * 1 *$ | $\|(0) - (1)\|$ | $= 0$ |
| $f_\alpha(10)*f_\beta(12)*$ | $\|f_\alpha(10)-f_\beta(12)\|$ | $= -1 * 0 *$ | $\|(-1) - (0)\|$ | $= 0$ |
| $f_\alpha(11)*f_\beta(13)*$ | $\|f_\alpha(11)-f_\beta(13)\|$ | $= -1 * 0 *$ | $\|(-1) - (0)\|$ | $= 0$ |
| $f_\alpha(12)*f_\beta(14)*$ | $\|f_\alpha(12)-f_\beta(14)\|$ | $= 0 * 1 *$ | $\|(0) - (1)\|$ | $= 0$ |
| $+ f_\alpha(x)*f_\beta(x)*$ | $\|f_\alpha(x)-f_\beta(x)\|$ | $= 0$ | | |

$\omega = 2, n = 12, C_\alpha = 0, C_\beta = 2$

| x= | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| α | 0 | -1 | 0 | 1 | 0 | -1 | 0 | 0 | -1 | 0 | 1 | 0 | -1 | 0 | | | | | | | | | | |
| β+2 | | | 1 | 0 | 1 | 0 | 1 | 0 | 0 | 1 | 0 | 1 | | | | | | | | | | | | |
| Ω | | | 1 | -1 | 0 | 1 | 1 | -1 | 0 | 1 | | | | | | | | | | | | | | |

$$0 = \sum_{\alpha=1}^{\omega-1}\sum_{\beta=\alpha+1}^{\omega}\sum_{x=0}^{L}(f_\alpha(x+C_\alpha)*f_\beta(x+C_\beta)*|f_\alpha(x+C_\alpha)-f_\beta(x+C_\beta)|)$$

$$0 = \sum_{x=0}^{12}(f_1(x)*f_2(x)*|f_1(x)-f_2(x)|)$$

| | | | |
|---|---|---|---|
| $f_\alpha(1)*f_\beta(1)*\|f_\alpha(1)-f_\beta(1)\|$ | = 0 * 0 * \|(0) - (0)\| | = 0 |
| $f_\alpha(2)*f_\beta(2)*\|f_\alpha(2)-f_\beta(2)\|$ | = -1 * 1 * \|(-1) - (1)\| | = -2 |
| $f_\alpha(3)*f_\beta(3)*\|f_\alpha(3)-f_\beta(3)\|$ | = -1 * 1 * \|(-1) - (1)\| | = -2 |
| $f_\alpha(4)*f_\beta(4)*\|f_\alpha(4)-f_\beta(4)\|$ | = -1 * 0 * \|(-1) - (0)\| | = 0 |
| $f_\alpha(5)*f_\beta(5)*\|f_\alpha(5)-f_\beta(5)\|$ | = -1 * 1 * \|(-1) - (1)\| | = 0 |
| $f_\alpha(6)*f_\beta(6)*\|f_\alpha(6)-f_\beta(6)\|$ | = 1 * 1 * \|(1) - (1)\| | = 0 |
| $f_\alpha(7)*f_\beta(7)*\|f_\alpha(7)-f_\beta(7)\|$ | = 1 * 1 * \|(1) - (1)\| | = 0 |
| $f_\alpha(8)*f_\beta(8)*\|f_\alpha(8)-f_\beta(8)\|$ | = 0 * 0 * \|(0) - (0)\| | = 0 |
| $f_\alpha(9)*f_\beta(9)*\|f_\alpha(9)-f_\beta(9)\|$ | = 0 * 1 * \|(-1) - (1)\| | = 0 |
| $f_\alpha(10)*f_\beta(10)*\|f_\alpha(10)-f_\beta(10)\|$ | = -1 * 1 * \|(-1) - (1)\| | = -2 |
| $f_\alpha(11)*f_\beta(11)*\|f_\alpha(11)-f_\beta(11)\|$ | = -1 * 1 * \|(-1) - (1)\| | = -2 |
| $f_\alpha(12)*f_\beta(12)*\|f_\alpha(12)-f_\beta(12)\|$ | = 0 * 0 * \|(0) - (0)\| | = 0 |
| $+f_\alpha(x)*f_\beta(x)*\|f_\alpha(x)-f_\beta(x)\|$ | = -8 | = -8 |

$\omega = 2, n = 12, C_\alpha = 0, C_\beta = 0$

FIG-20

$$0 = \sum_{\alpha=1}^{\omega-1} \sum_{\beta=\alpha+1}^{\omega} \sum_{x=0}^{L} (f_\alpha(x+C_\alpha) * f_\beta(x+C_\beta) * |f_\alpha(x+C_\alpha) - f_\beta(x+C_\beta)|)$$

4 Mode 1s * 4 Mode 2s * 2 Mode 3s
Total = 32 Mode Variant Combos

| 1A + 2A + 3A | 1A + 2A + 3B |
|---|---|
| 1B + 2A + 3A | 1B + 2A + 3B |
| 1C + 2A + 3A | 1C + 2A + 3B |
| 1D + 2A + 3A | 1D + 2A + 3B |
| 1A + 2B + 3A | 1A + 2B + 3B |
| 1B + 2B + 3A | 1B + 2B + 3B |
| 1C + 2B + 3A | 1C + 2B + 3B |
| 1D + 2B + 3A | 1D + 2B + 3B |
| 1A + 2C + 3A | 1A + 2C + 3B |
| 1B + 2C + 3A | 1B + 2C + 3B |
| 1C + 2C + 3A | 1C + 2C + 3B |
| 1D + 2C + 3A | 1D + 2C + 3B |
| 1A + 2D + 3A | 1A + 2D + 3B |
| 1B + 2D + 3A | 1B + 2D + 3B |
| 1C + 2D + 3A | 1C + 2D + 3B |
| 1D + 2D + 3A | 1D + 2D + 3B |

| x | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1A | -1 | 1 | 1 | 0 | -1 | -1 | 0 | -1 | -1 | 1 | 1 | 0 | -1 | -1 | 0 | -1 |
| 1B | -1 | 0 | 1 | 0 | -1 | -1 | -1 | -1 | -1 | 0 | 1 | 0 | -1 | -1 | -1 | -1 |
| 1C | -1 | 1 | 0 | 1 | -1 | -1 | 0 | -1 | -1 | 1 | 0 | 1 | -1 | -1 | 0 | -1 |
| 1D | -1 | 0 | 0 | 1 | -1 | -1 | -1 | -1 | -1 | 0 | 0 | 1 | -1 | -1 | -1 | -1 |
| 2A | -1 | 1 | -1 | -1 | 0 | 1 | 0 | -1 | -1 | 1 | -1 | -1 | 0 | 1 | 0 | -1 |
| 2B | -1 | 0 | -1 | -1 | 0 | 1 | 1 | -1 | -1 | 0 | -1 | -1 | 0 | 1 | 1 | -1 |
| 2C | -1 | 1 | -1 | -1 | 1 | 0 | 0 | -1 | -1 | 1 | -1 | -1 | 1 | 0 | 0 | -1 |
| 2D | -1 | 0 | -1 | -1 | 1 | 0 | 1 | -1 | -1 | 0 | -1 | -1 | 1 | 0 | 1 | -1 |
| 3A | 1 | -1 | -1 | -1 | 0 | 0 | -1 | 0 | 1 | -1 | -1 | -1 | 0 | 0 | -1 | 0 |
| 3B | 0 | -1 | -1 | -1 | 0 | 0 | -1 | -1 | 0 | -1 | -1 | -1 | 0 | 0 | -1 | -1 |

*FIG-24*

$$0 = \sum_{\alpha=1}^{\omega-1} \sum_{\beta=\alpha+1}^{\omega} \sum_{x=0}^{L} (f_\alpha(x+C_\alpha) * f_\beta(x+C_\beta) * |f_\alpha(x+C_\alpha) - f_\beta(x+C_\beta)|)$$

$\alpha = 1A \quad \beta = 2A \quad C_\alpha = 0 \quad C_\beta = ?$

| x | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| $C_\alpha = 0$ | -1 | -1 | 1 | 0 | -1 | -1 | 0 | -1 | -1 | -1 | 1 | 0 | -1 | -1 | 0 | -1 |
| $C_\beta = 0$ | -1 | -1 | -1 | -1 | 0 | 1 | 0 | -1 | -1 | 1 | -1 | -1 | 0 | -1 | 0 | -1 |
| 1 | 1 | -1 | -1 | 0 | 1 | 0 | -1 | 1 | 1 | -1 | -1 | 0 | 1 | 0 | -1 | -1 |
| 2 | -1 | -1 | 0 | 1 | 0 | -1 | 1 | 1 | -1 | -1 | 0 | 1 | 0 | -1 | -1 | 1 |
| 3 | -1 | 0 | 1 | 0 | -1 | 1 | -1 | -1 | -1 | 0 | 1 | 0 | -1 | 1 | -1 | -1 |
| 4 | 0 | 1 | 0 | -1 | -1 | 1 | -1 | 0 | 0 | 1 | 0 | -1 | 1 | 1 | -1 | 0 |
| 5 | 1 | 0 | -1 | 1 | 1 | -1 | -1 | 0 | 1 | 0 | -1 | 1 | 1 | -1 | -1 | 0 |
| 6 | 0 | -1 | -1 | -1 | -1 | -1 | 0 | 1 | 0 | -1 | 1 | 1 | -1 | -1 | 0 | 1 |
| 7 | -1 | -1 | 1 | -1 | -1 | 0 | 1 | 0 | -1 | 1 | 1 | -1 | -1 | 0 | 1 | 0 |
| 8 | -1 | 1 | -1 | -1 | 0 | 1 | 0 | -1 | -1 | -1 | -1 | -1 | 0 | -1 | 0 | -1 |

*FIG-25*

$$O = \sum_{\alpha=1}^{\omega-1} \sum_{\beta=\alpha+1}^{\omega} \sum_{x=0}^{L} \left( f_\alpha(x+C_\alpha) * f_\beta(x+C_\beta) * |f_\alpha(x+C_\alpha) - f_\beta(x+C_\beta)| \right)$$

$\alpha = 1A \quad \beta = 3A \quad C_\alpha = 0 \quad C_\beta = ?$

| x | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| $C_\alpha = 0$ | -1 | 1 | 1 | 0 | -1 | -1 | 0 | -1 | -1 | 1 | 1 | 0 | -1 | -1 | 0 | -1 |
| $C_\beta = 0$ | 1 | -1 | -1 | -1 | 0 | 0 | -1 | 0 | 1 | -1 | 0 | 0 | 0 | 0 | -1 | 0 |
| 1 | -1 | -1 | 0 | 0 | 0 | -1 | 0 | 1 | -1 | -1 | 0 | 0 | -1 | -1 | 0 | -1 |
| 2 | -1 | -1 | 0 | 0 | -1 | 0 | -1 | -1 | -1 | -1 | 0 | 0 | 0 | 0 | 1 | -1 |
| 3 | -1 | 0 | 0 | -1 | 0 | 1 | -1 | -1 | -1 | 0 | -1 | -1 | 0 | 1 | -1 | -1 |
| 4 | 0 | 0 | -1 | 0 | 1 | -1 | -1 | -1 | 0 | 0 | 0 | 0 | 1 | -1 | -1 | -1 |
| 5 | 0 | -1 | 0 | 1 | -1 | -1 | -1 | 0 | 0 | 0 | -1 | 1 | -1 | -1 | -1 | 0 |
| 6 | -1 | 0 | 1 | -1 | -1 | -1 | 0 | -1 | -1 | 0 | 1 | -1 | -1 | -1 | 0 | 0 |
| 7 | 0 | 1 | -1 | -1 | -1 | 0 | -1 | -1 | 0 | 1 | -1 | -1 | -1 | 0 | 0 | -1 |
| 8 | 1 | -1 | -1 | -1 | 0 | 0 | -1 | 0 | 1 | -1 | -1 | -1 | 0 | 0 | -1 | 0 |

FIG-26

$$O = \sum_{\alpha=1}^{\omega-1} \sum_{\beta=\alpha+1}^{\omega} \sum_{x=0}^{L} \left( f_\alpha(x+C_\alpha) * f_\beta(x+C_\beta) * |f_\alpha(x+C_\alpha) - f_\beta(x+C_\beta)| \right)$$

$\alpha = 2A \quad \beta = 3A \quad C_\alpha = 0 \quad C_\beta = ?$

FIG-27

$$0 = \sum_{\alpha=1}^{\omega-1} \sum_{\beta=\alpha+1}^{\omega} \sum_{x=0}^{L} (f_\alpha(x+c_\alpha) * f_\beta(x+c_\beta) * f_\alpha(x+c_\alpha) - f_\beta(x+c_\beta))$$

| | x = 0 | 1 | 2 | 3 | 4 | 5 | 6 | 7 | 8 | 9 | 10 | 11 | 12 | 13 | 14 | 15 | |
|---|---|---|---|---|---|---|---|---|---|---|---|---|---|---|---|---|---|
| x = | $n*(\omega-1)=60$ | | | | | | | | | | | | | | | | $n*(\omega-1)=60$ |
| 1 = | $n*(\omega-1)-C_1$ | 1 | -1 | 1 | 1 | 0 | 0 | 0 | 0 | 0 | 0 | 0 | 1 | 1 | 1 | 1 | $n*(\omega-1)+C_1$ |
| 2 = | $n*(\omega-1)-C_2$ | 1 | 1 | -1 | -1 | 0 | 0 | 0 | 0 | 0 | 0 | 0 | 1 | 1 | 1 | 1 | $n*(\omega-1)+C_2$ |
| 3 = | $n*(\omega-1)-C_3$ | 1 | 1 | 1 | 1 | 0 | 0 | 0 | 0 | 0 | 0 | 0 | -1 | -1 | 1 | 1 | $n*(\omega-1)+C_3$ |
| 4 = | $n*(\omega-1)-C_4$ | 1 | 1 | 1 | 1 | 0 | 0 | 0 | 0 | 0 | 0 | 0 | 1 | 1 | 1 | -1 | $n*(\omega-1)+C_4$ |
| 5A = | $n*(\omega-1)-C_{5A}$ | 1 | 1 | 1 | -1 | 0 | 0 | 0 | 0 | 0 | 0 | 0 | 1 | 1 | 1 | 1 | $n*(\omega-1)+C_{5A}$ |
| 5B = | $n*(\omega-1)-C_{5B}$ | 1 | 1 | 1 | -1 | 0 | 0 | 0 | 0 | 0 | 0 | 0 | -1 | 1 | 1 | 1 | $n*(\omega-1)+C_{5B}$ |
| 5C = | $n*(\omega-1)-C_{5C}$ | 1 | -1 | 1 | 1 | 0 | 0 | 0 | 0 | 0 | 0 | 0 | -1 | 1 | 1 | 1 | $n*(\omega-1)+C_{5C}$ |
| 5D = | $n*(\omega-1)-C_{5D}$ | 1 | -1 | 1 | 1 | 0 | 0 | 0 | 0 | 0 | 0 | 0 | 1 | -1 | 1 | 1 | $n*(\omega-1)+C_{5D}$ |

*FIG-31*

$$0 = \sum_{\alpha=1}^{\omega-1} \sum_{\beta=\alpha+1}^{\omega} \sum_{x=0}^{L} (f_\alpha(x+C_\alpha) * f_\beta(x+C_\beta) * |f_\alpha(x+C_\alpha) - f_\beta(x+C_\beta)|)$$

| x = | $n*(\omega-1) = 60$ | 61 | 62 | 63 | 64 | 65 | 66 | 67 | 68 | 69 | 70 | 71 | 72 | 73 | 74 | 75 | $n*(\omega-1) = 60$ |
|---|---|---|---|---|---|---|---|---|---|---|---|---|---|---|---|---|---|
| 1 = | $n*(\omega-1)-C_1$ | -1 | | | | | 0 | 0 | 0 | 0 | 0 | | | | | 1 | $n*(\omega-1)+C_1$ |
| 2 = | $n*(\omega-1)-C_2$ | 1 | -1 | | | | 0 | 0 | 0 | 0 | 0 | | | | 1 | 1 | $n*(\omega-1)+C_2$ |
| 3 = | $n*(\omega-1)-C_3$ | 1 | 1 | 1 | | | 0 | 0 | 0 | 0 | 0 | -1 | | | 1 | 1 | $n*(\omega-1)+C_3$ |
| 4 = | $n*(\omega-1)-C_4$ | 1 | 1 | 1 | | -1 | 0 | 0 | 0 | 0 | 0 | | -1 | 1 | 1 | 1 | $n*(\omega-1)+C_4$ |
| 5A = | $n*(\omega-1)-C_{5A}$ | 1 | 1 | 1 | -1 | | 0 | 0 | 0 | 0 | 0 | -1 | 1 | 1 | 1 | 1 | $n*(\omega-1)+C_{5A}$ |
| 5B = | $n*(\omega-1)-C_{5B}$ | 1 | 1 | 1 | -1 | | 0 | 0 | 0 | 0 | 0 | -1 | 1 | 1 | 1 | 1 | $n*(\omega-1)+C_{5B}$ |
| 5C = | $n*(\omega-1)-C_{5C}$ | 1 | 1 | -1 | | | 0 | 0 | 0 | 0 | 0 | -1 | 1 | 1 | 1 | 1 | $n*(\omega-1)+C_{5C}$ |
| 5D = | $n*(\omega-1)-C_{5D}$ | 1 | -1 | | | | 0 | 0 | 0 | 0 | 0 | -1 | 1 | 1 | 1 | 1 | $n*(\omega-1)+C_{5D}$ |

*FIG-32*

$$O = \sum_{\alpha=1}^{\omega-1} \sum_{\beta=\alpha+1}^{\omega} \sum_{x=0}^{L} (f_\alpha(x+C_\alpha) * f_\beta(x+C_\beta) * |f_\alpha(x+C_\alpha) - f_\beta(x+C_\beta)|)$$

FIG-33

$$0 = \sum_{\alpha=1}^{\omega-1} \sum_{\beta=\alpha+1}^{\omega} \sum_{x=0}^{L} \bigl( f_\alpha(x+C_\alpha) * f_\beta(x+C_\beta) * |f_\alpha(x+C_\alpha) - f_\beta(x+C_\beta)| \bigr)$$

X = | 1 | 2 | 3 | 4 | 5 | 6 | 7 | 8 |

$\Omega_L$ = | -1 | -1 | -1 | 1 | -1 | -1 | -1 | 1 |

Scale to 3/5

X = | 1 | 2 | 3 | 4 | 5 | 6 | 7 | 8 |

$\Omega$ = | -1 | -1 | -1 | -1 | -1 | -1 | -1 | 1 |

1 to 1 Scale

X = | 1 | 2 | 3 | 4 | 5 | 6 | 7 | 8 | 9 | 10 | 11 | 12 | 13 | 14 | 15 | 16 | 17 | 18 | 19 | 20 | 21 |

$\Omega$ = | 1 | 1 | 1 | 1 | 1 | 1 | -1 | -1 | -1 | 1 | 0 | 1 | 1 | -1 | -1 | -1 | 1 | 1 | 1 | 1 | 1 |

*FIG-36*

$$O = \sum_{\alpha=1}^{\omega-1} \sum_{\beta=\alpha+1}^{\omega} \sum_{x=0}^{L} (f_\alpha(x+C_\alpha) * f_\beta(x+C_\beta) * |f_\alpha(x+C_\alpha) - f_\beta(x+C_\beta)|)$$

| X =  | 1  | 2  | 3  | 4  | 5  | 6  | 7  | 8  | 9 | 10 | 11 | 12 | 13 | 14 | 15 |
|------|----|----|----|----|----|----|----|----|---|----|----|----|----|----|----|
| 3A = | 0  | -1 | 0  | 0  | -1 | -1 | -1 | 1  |   |    |    |    |    |    |    |
| 1 =  | -1 | -1 | 1  | 1  | 0  | 0  | 0  | 0  | 0 | 0  | 1  | 1  | 1  | 1  | 1  |
| 1B = | -1 | -1 | -1 | -1 | 0  | 0  | 0  | -1 |   |    |    |    |    |    |    |
| 2 =  | -1 | -1 | -1 | -1 | 0  | 0  | 0  | 0  | 0 | 0  | 1  | 1  | 1  | 1  | 1  |
| 2A = | -1 | 0  | 1  | 0  | -1 | -1 | -1 | -1 |   |    |    |    |    |    |    |
| 5A = | -1 | 1  | 1  | 1  | 0  | 0  | 0  | 0  | 0 | 0  | -1 | 1  | 1  | 1  | 1  |
| 3A = | 0  | -1 | 0  | 0  | -1 | -1 | -1 | 1  |   |    |    |    |    |    |    |
| 3 =  | 1  | 1  | 1  | 1  | 0  | 0  | 0  | 0  | 0 | 0  | -1 | -1 | 1  | 1  | 1  |
| 1B = | -1 | -1 | -1 | -1 | 0  | 0  | 0  | -1 |   |    |    |    |    |    |    |
| 4 =  | 1  | 1  | 1  | 1  | 0  | 0  | 0  | 0  | 0 | 0  | 0  | 1  | -1 | -1 | -1 |

*FIG-37*

$$O = \sum_{\alpha=1}^{\omega-1} \sum_{\beta=\alpha+1}^{\omega} \sum_{x=0}^{L} (f_\alpha(x+C_\alpha) * f_\beta(x+C_\beta) * |f_\alpha(x+C_\alpha) - f_\beta(x+C_\beta)|)$$

FIG-38

$$0 = \sum_{\alpha=1}^{\omega-1} \sum_{\beta=\alpha+1}^{\omega} \sum_{x=0}^{L} (f_\alpha(x+C_\alpha) * f_\beta(x+C_\beta) * |f_\alpha(x+C_\alpha) - f_\beta(x+C_\beta)|)$$

FIG-39

FILM DOOR BELT FLUID FLOW CONTROL SYSTEM

FIELD

The present disclosure relates to any system which controls the flow of fluids, and more specifically to a fluid flow control system having mode control using a belt configuration.

BACKGROUND

This section provides background information related to the present disclosure which is not necessarily prior art.

Currently fluid flow control systems (FFCS) (such as heating, ventilation, and air-conditioning (HVAC) systems, or a water treatment plant flow control system) utilize a series of components, such as doors and ribs, dispersed throughout the FFCS packaging to control fluid flow (such as airflow or water flow) within the packaging. The distribution of fluid flow through various outlets in the packaging is usually determined by predetermined "modes."

Static control surfaces, such as ribs, are used to direct fluid flow through the system. However, the ability to direct fluid flow with a static control surface can be difficult for multiple modes. Typically, the greater the difference between the modes, the less efficient or effective ribs will be.

Dynamic control surfaces, such as doors, are typically located in front of outlets within the packaging. Door orientation balances controlling the amount of fluid being allowed through the outlet, per the mode requirement, and minimizing the pressure drop created. Usually, doors are controlled by a servo motor, often through a series of linkages and/or gears. While more effective and efficient than ribs, doors and their driving components add to the cost of the system and the packaging materials and space used by the FFCS.

SUMMARY

This section provides a general summary of the disclosure, and is not a comprehensive disclosure of its full scope or all of its features.

At least one example embodiment of a fluid flow control system (FFCS) door assembly according to the present disclosure includes a continuous belt and a plurality of rollers. The plurality of rollers support the continuous belt and define a first segment, a second segment, a third segment, and a fourth segment. (It is understood that the number of segments described is incidental to the example being given, and other possible designs may include fewer, for example, as few as one segment, or more, such as unlimited segments.) The continuous belt includes a plurality of openings that selectively allow fluid flow to pass through the first segment, the second segment, the third segment, and the fourth segment when two openings of the plurality of openings align with the first segment, the second segment, the third segment, or the fourth segment.

In at least one example embodiment, a frame may support the plurality of rollers and may include a track on which the continuous belt moves.

In at least one example embodiment, a single motor may drive one of the plurality of rollers to move the continuous belt.

In at least one example embodiment, a casing may house the continuous belt and the plurality of rollers.

In at least one example embodiment, a filter fixed within a window of the casing may align with the first segment.

In at least one example embodiment, the door assembly may include a filter.

In at least one example embodiment, a rack may be fixed for movement with the continuous belt. A hard stop may be engaged with the rack and configured to stop movement of the rack and the continuous belt upon contact with a wall.

In at least one example embodiment, the first segment may align with a fresh air channel and a first output channel, the second segment may align with a first recirculation air channel and the first output channel, the third segment may align with a second recirculation air channel and a second output channel, and the fourth segment may separate the first output channel from the second output channel.

In at least one example embodiment, the FFCS system may be configured to achieve one or more FFCS modes. For example, in a heating, ventilation, and air conditioning (HVAC) system, the FFCS modes may be an all fresh HVAC mode, an all recirculation HVAC mode, and a two-layer HVAC mode. During the all fresh HVAC mode, the two openings of the plurality of openings may align with the first segment to permit airflow communication between the fresh air channel and the first output channel, and an additional two openings of the plurality of openings may align with the fourth segment to permit airflow communication between the first output channel and the second output channel.

In at least one example embodiment, during the all fresh HVAC mode, the continuous belt may block airflow to the second segment, preventing airflow communication between the first recirculation air channel and the first output channel, and the continuous belt may block airflow to the second segment, preventing airflow communication between the second recirculation air channel and the second output channel.

In at least one example embodiment, during the all recirculation HVAC mode, the two openings of the plurality of openings may align with the second segment to permit airflow communication between the first recirculation air channel and the first output channel, and an additional two openings of the plurality of openings may align with the third segment to permit airflow communication between the second recirculation air channel and the second output channel.

In at least one example embodiment, during the all recirculation HVAC mode, the continuous belt may block airflow to the first segment, preventing airflow communication between the fresh air channel and the first output channel, and the continuous belt may block airflow to the fourth segment, preventing airflow communication between the first output channel and the second output channel.

In at least one example embodiment, during the two-layer HVAC mode, the two openings of the plurality of openings may align with the first segment to permit airflow communication between the fresh air channel and the first output channel, and an additional two openings of the plurality of openings may align with the third segment to permit airflow communication between the second recirculation air channel and the second output channel.

In at least one example embodiment, during the two-layer HVAC mode, the continuous belt may block airflow to the second segment, preventing airflow communication between the first recirculation air channel and the first output channel, and the continuous belt may block airflow to the fourth segment, preventing airflow communication between the first output channel and the second output channel.

At least one example embodiment of a heating, ventilation, and air conditioning (HVAC) system according to the present disclosure includes a package, and an HVAC door. The package may house a fresh air channel, a first recirculation air channel, a second recirculation air channel, a first output channel, and a second output channel. The HVAC door may separate the fresh air channel, the first recirculation air channel, and the second recirculation air channel from the first output channel and the second output channel. The HVAC door may include a continuous belt and a plurality of rollers supporting the continuous belt. The plurality of rollers may define a first segment, a second segment, a third segment, and a fourth segment, with the first segment aligning with the fresh air channel and the first output channel, the second segment aligning with the first recirculation air channel and the first output channel, the third segment aligning with the second recirculation air channel and the second output channel, and the fourth segment separating the first output channel and the second output channel. (It is understood that the number of segments described is incidental to the example being given, and other possible designs may include fewer, for example, as few as one segment, or more, such as unlimited segments.) The continuous belt may include a plurality of openings that selectively allow airflow to pass through the first segment, the second segment, the third segment, and the fourth segment when two openings of the plurality of openings align with the first segment, the second segment, the third segment, or the fourth segment.

At least one example embodiment of a method of developing and validating a door belt for a fluid flow control system (FFCS) according to the present disclosure includes: identifying a ribbon path for the door belt; identifying a plurality of FFCS mode patterns for the ribbon path; converting the plurality of FFCS mode patterns into a plurality of FFCS mode functions; setting a common starting point for all of the plurality of FFCS mode patterns; and determining whether the plurality of FFCS mode patterns are valid based on whether the plurality of FFCS mode functions can be overlaid with a plurality of given offsets.

In at least one example embodiment, the ribbon path for the door belt may be an endless looping ribbon design, a non-looping ribbon design, or a combination thereof.

In at least one example embodiment, the FFCS mode patterns may be at least one of an all fresh mode, a two-layer mode, and an all recirculation mode.

In at least one example embodiment, the method may include converting FFCS mode requirements for each of the plurality of FFCS mode patterns into rib placements, static percentage requirements, percent range requirements, FFCS system inlets blocked, and FFCS outlets blocked.

In at least one example embodiment, the determining whether the plurality of FFCS mode patterns are valid may include overlaying the plurality of FFCS mode functions using a validation equation.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 13 is a chart including the validation equation that determines whether or not a given combination of ribbon modes can be combined and provides the possible ways of combining arrays for the different FFCS modes of FIGS. 10A-12B.

FIG. 15 is a chart providing at least one example embodiment of a validation equation for the chart in FIG. 14 and indicating that a position "x" in an example FFCS mode must be open (−1), another FFCS mode must be closed (1), and in another FFCS mode it may not matter if it is open or closed (0).

FIG. 16 is a chart indicating that the validation equation will validate a pattern combination by summing the comparison results for the values of each function at all positions "x" in the validation equation of FIG. 15.

FIG. 17 is a chart explaining that a valid design will have at least one set of offset values that make the validation equation return a zero result.

FIG. 18 is a chart showing an example combination of HVAC modes that do not have a valid set of offsets, thereby indicating that those design are not valid (e.g. impossible).

FIG. 19 is another chart showing an example combination of HVAC modes that do not have a valid set of offsets, thereby indicating that those design are not valid (e.g. impossible).

FIG. 20 is another chart showing an example combination of HVAC modes that do not have a valid set of offsets, thereby indicating that those design are not valid (e.g. impossible).

FIG. 24 is a chart of example modes/variants from FIGS. 10A-12B, converted into functions.

FIG. 25 is a chart showing the comparisons between the pattern of the modes shown in FIGS. 10A and 11A, where the modes in FIG. 10A are compared to each possible offset for modes in FIG. 11A.

FIG. 26 is a chart showing the comparisons between the pattern of the modes shown in FIGS. 10A and 12A, where the modes in FIG. 10A are compared to each possible offset for the modes in FIG. 12A.

FIG. 27 is a chart showing the comparisons between the pattern of the modes shown in FIGS. 11A and 12A, where the modes in FIG. 11A are compared to each possible offset for the modes in FIG. 12A.

FIG. 31 is a chart showing an example application of the validation equation to the HVAC modes in FIGS. 30A-30F.

FIG. 32 is a chart showing the valid results of the example application in FIG. 31.

FIG. 33 is a chart providing an example most efficient solution for the valid results of FIG. 32.

FIG. 36 is a chart establishing a common scale for units distance of x.

FIG. 37 is a chart determining at least on example offset for the door belts in the HVAC door assembly in FIG. 34.

FIG. 38 is a chart determining an example most efficient solution for the HVAC door assembly in FIG. 34.

FIG. 39 is a chart determining an example valid ribbon design for the HVAC door assembly in FIG. 34.

Corresponding reference numerals indicate corresponding parts throughout the several views of the drawings.

DETAILED DESCRIPTION

Figure 1:
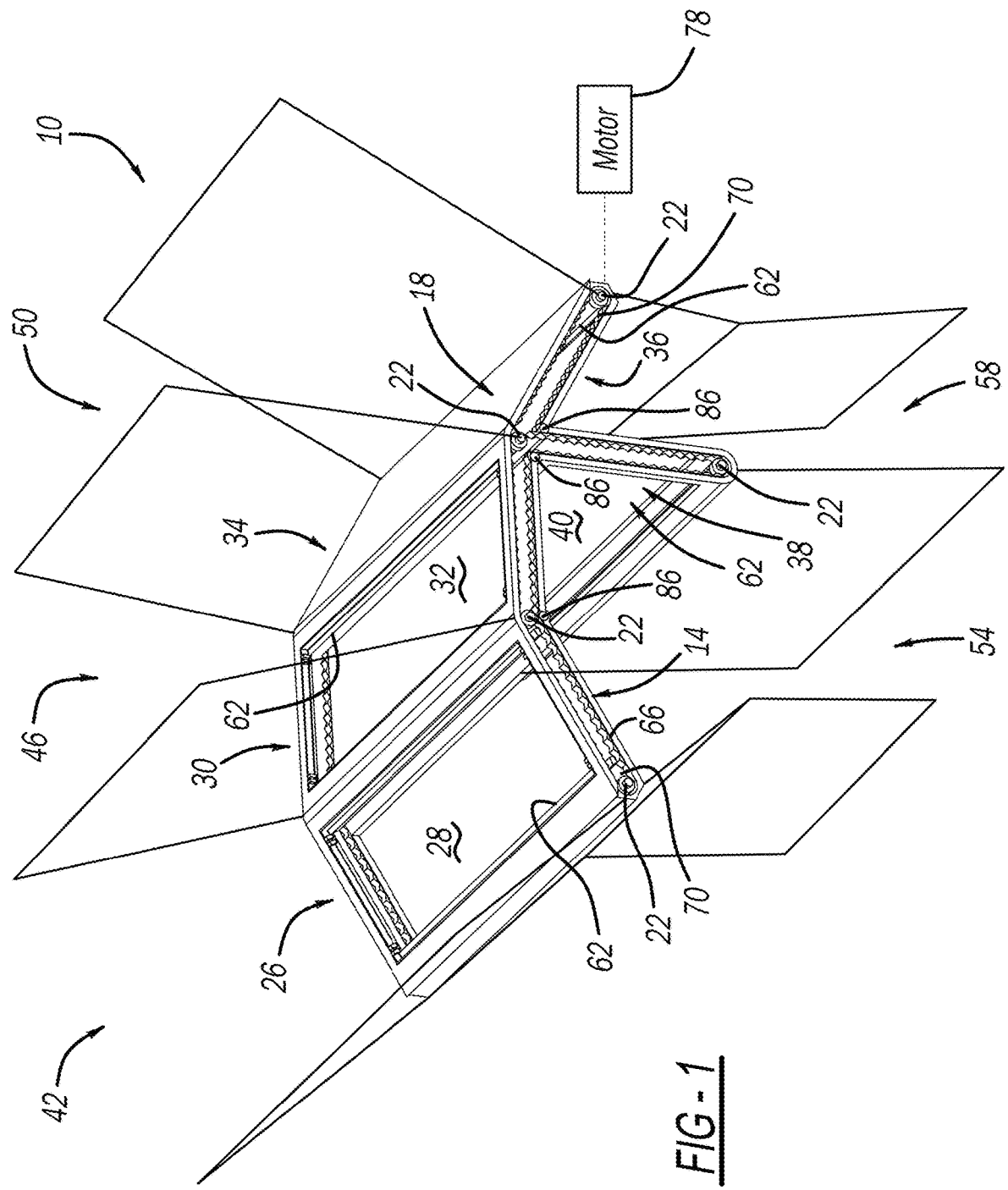
FIG. 1 is a perspective view of at least one example embodiment for an HVAC door assembly supported within a housing according to the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms.

These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Currently, the heating, ventilation, and air conditioning (HVAC) industry is trending towards the reduction of packaging materials and space used by HVAC systems. One factor that currently affects HVAC packaging is associated with the door used for fresh/recirculation mode actuation. The HVAC packaging houses multiple doors (and each door's servo motor and complex gearing/linkages for actuation) to switch between various HVAC modes utilizing fresh air and/or recirculated air. When designing the HVAC system, door swing for each of the multiple doors must be accounted for in the packaging. Door swing for each of the multiple doors limits how much the packaging may be reduced without affecting functionality.

A fluid flow control system (FFCS) film door belt example design of the present disclosure may be utilized for a heating, ventilation, and air conditioning (HVAC) dual layer Fresh/Recirculation application. The FFCS film door belt utilizes a continuous belt configuration having a single actuator to switch between fresh mode and recirculation mode. The design provides the ability to control several doors at any single instance of actuation with the single actuator, and therefore control multiple inlets and outlets. The door belt design also acts as a guide for fluid flow (for example, airflow) as it creates isolated paths that control how fluid is distributed from the inlet and outlet. The FFCS film door belt design therefore provides a reduction in packaging and components or parts (for example, reduce from multiple motors to a single motor and eliminate complex gearing). For example only, when implemented in the HVAC system it is estimated that the FFCS film door belt design reduces package height (i.e., size and materials) to approximately 27% of the original size since door swing is no longer a factor that must be considered. These reductions, in turn, reduce cost and weight of the HVAC system.

The FFCS film door belt design also creates the ability to make all of an FFCS system's control surfaces dynamic, including control surfaces that are traditionally static. Static control surfaces include ribs (for example, square ribs, trapezoidal ribs, hemispherical ribs, etc.), bumps, or other permanent, non-movable, surface features, and are often not the ideal shape for every mode. Thus, static control surfaces are therefore a compromise design that works as well as it can for all modes, but not the best for any one of them. Alternatively, dynamic control surfaces, such as those described herein, create the possibility of increasing the FFCS system's performance and/or efficiency. The degree to which efficiency can be increased is based on the amount of inefficiency caused by the compromised design of static control surfaces. The dynamic control surfaces can be positioned to optimize the balance between flow control and flow restriction. As long as it results in a valid design (described below), the dynamic control surfaces may be placed anywhere in the system that optimizes flow for each mode.

The FFCS film door belt design is targeted for use in two-layer HVAC units having three modes: all fresh mode, all recirculation mode, and two-layer mode (combination fresh and recirculation). The two-layer units create a total of three inlets and two outlets, increasing variety and temperature control. The FFCS film door belt design of the present disclosure reduces the overall size of the current two-layer unit housing and reduces the effective cost for two-layer integration by reducing the number of functional parts typically associated with a two-layer unit.

The proposed design is a ribbon (for example, belt fabric or flexible material/assembly) which spaces across a series of waypoints (for example, rollers, pins, gears, etc.), similar to a conveyor belt. The ribbon may be a continuous ribbon, made from a single sheet of material or made from multiple sheets attached to form a single sheet. Unlike a conveyor belt, the ribbon includes holes, which form a pattern of open and closed sections in the ribbon. By aligning either open or closed sections with the openings to system outlets, fluid flow can either be directed through or blocked, respectively. Through the use of the ribbon having open and closed sections, the percentage flow to each outlet can be controlled precisely, creating a system output mode. A single ribbon can be designed to create a set of modes, given that the mode alignments can be solved for in a validation equation (described below). The type of ribbon design used will influence the ability to solve the validation equation.

Ribbon design variants can be grouped as "looping" or "non-looping" and as "single ribbon" or "multi-ribbon." In looping ribbons, a start of a ribbon and an end of a ribbon are attached, such that the ribbon can have endless travel in either direction. Non-looping ribbons include designs where the ends are not connected, and the ribbon "spools" at the waypoints on one or both ends of travel. A key difference between looping and non-looping ribbons is that the non-looping ribbon can be flexible in its design length, whereas a length of the looping ribbon is determined by a path length.

A single ribbon includes designs having only one (a single), continuous ribbon. Multi-ribbons are designed to include two or more continuous ribbons. For a single ribbon design, the validation equation only needs to be solved once. However, for a multi-ribbon design, the validation equation must be solved multiple times. Additionally, a multi-ribbon design must scale a function length proportionally to the ratios of movement between the multiple ribbons.

The options for multiple ribbon designs provides the FFCS film door belt design with multiple options for controlling fluid flow through the system. Additionally any of the multiple ribbon designs provides a reduced number of components, an ability for making all of the system's control surfaces dynamic, and an ability to precisely control fluid flow through the outlets in the system. Thus, any of the multitude of ribbon designs may be coupled with the FFCS film door belt design to increase efficiency and performance of the FFCS while reducing parts, cost, weight, and space occupied by the FFCS.

Now referring to FIG. 1, an FFCS film door belt, or door assembly, 10 according to the present disclosure is illustrated. The door assembly 10 includes a door frame 14, a door belt 18, and a plurality of rollers 22. In at least one example embodiment, the plurality of rollers 22 may be part of a series of waypoints which may include rollers, pins, gears, etc. The door assembly 10 is supported within a package, or housing, 24 for an FFCS (for example, an HVAC) system.

In at least one example embodiment, the door fame 14 may provide access between three inlets and two outlets. While three inlets and two outlets are illustrated and described, it is understood that this is an example configuration and the description herein may be applied to any number of inlets and any number of outlets. The door frame 14 may include a plurality of segments 26, 30, 34, 38 separated by the plurality of rollers 22. Each of the plurality of segments 26, 30, 34, 38 may define a window 28, 32, 36, 40 therein. The segment 26 may selectively provide access to a fresh air channel 42 through window 28. The segment 30 may selectively provide access to a first recirculation air channel 46 through window 32. The segment 34 may selectively provide access to a second recirculation air channel 50 through window 36. The segment 38 may provide two-layer separation and may selectively provide access between a first output channel 54 and a second output channel 58 through window 40.

In at least one example embodiment the door frame 14 may be formed of a moldable polymer (such as polypropylene or plastic), a metallic material (E.G., aluminum, 10, stainless steel, or the like), a combination materials, or any other suitable material or combination thereof. In at least one example embodiment, the door frame 14 may be formed by injection molding, blow molding, thermoforming, compression molding, vacuum casting, or any other polymer from forming process. In at least one example embodiment, the door frame 14 may be formed by rolling, stamping, another metalworking procedure, or a combination of these.

In at least one alternative embodiment, the door frame 14 may be defined by the rollers 22 or other waypoints without any additional structure. The rollers 22 or other waypoints may be supported on axles by walls of the FFCS packaging 24.

The door belt 18 may be a ribbon of belt fabric or flexible material or assembly having a plurality of openings 62 cut out in different positions. For example, door belt 18 may be a continuous ribbon, made from a single sheet of material or made from multiple sheets attached to form a single sheet. In at least one example embodiment, the door belt 18 may be formed of a flexible material, such as a fabric or cloth, leather, rubber, neoprene, urethane synthetic materials, a combination of these, or any other suitable material.

The door belt 18 may be designed to accommodate various design constraints. In at least one example embodiment, the door belt 18 may be a single, continuous belt of material (i.e, a "single ribbon"). In at least one alternative example embodiment, the door belt 18 may be designed to include two or more continuous belts of material or ribbons (i.e, a "multi-ribbon"). In at least one example embodiment, the door belt 18 may be a "looping ribbon" designed such that a start and an end of the door belt 18 are attached, and the door belt 18 can travel endlessly in either direction. In at least one alternative example embodiment, the door belt 18 may be a non-looping ribbon design where a first end and a second end of the door belt 18 are not connected. The door belt 18 spools at the waypoints or rollers 22 at the first end, the second end, or both the first end and the second end. A key difference between the looping ribbon and the non-looping ribbon is that the non-looping ribbon can be flexible in its design length, whereas the looping ribbon's length is determined by the door path length. The door belt design 18 may be developed and validated for each intended application and location in the FFCS packaging 24 (see FIG. 8 and description below).

The door belt 18 may be positioned on a track 66 on the door frame 14. The rollers 22 may be positioned at opposing ends of each segment 26, 30, 34, 38. The rollers 22 may be positioned on an inside surface 70 of the door belt 18 and may move the door belt 18 along the track 66 on the door frame 14. In at least one example embodiment, the rollers 22 may be cylindrical rods that extend a width of the segments 26, 30, 34, 38 and may grip the door belt 18 through friction to move the door belt 18 along the track 66. Alternatively, in at least one example embodiment the rollers 22 may include teeth 74 that gripped the door belt 18 to move the door belt 18 along the track 66.

In at least one example embodiment, a single motor 78 drives a single roller 22 which pushes the door belt 18 over the entire door frame 14. Thus, the remainder of the rollers 22 which are not driven by the motor 78 are pushed by the movement of the door belt 18 around the door frame 14. For example, since the door belt 18 connects the rollers 22 of each segment 26, 30, 34, 38, driving a single roller 22 will push the door belt 18, driving the remainder of the rollers 22. Thus, only a single roller 22 must be driven by the motor 78 to move the door belt 18 along the track 66 over the entire door frame 14.

In at least one alterative example embodiment, the rollers 22 may be connected by pulleys (not shown). In at least one example embodiment, the pulleys may be continuous belts that extend between the rollers 22 of each segment 26, 30, 34, 38. The pulleys may be connected to a single motor 78 that drives the pulleys simultaneously. For example, since the pulleys connect the rollers 22 of each segment 26, 30, 34, 38, driving a single pulley will drive the remainder of the pulleys. Thus, only a single pulley or a single roller 22 must be driven by the motor 78 to move the door belt 18 along the track 66 over the entire door frame 14. This reduces the number of parts that must be housed within the packaging (and purchased) for the door assembly 10.

Secondary rollers 86 may be positioned between the segment 26 and the segment 30, between the segment 30 and the segment 38, and between the segment 34 and the segment 38 to hold the door belt 18 against the track 66 and against the rollers 22. The secondary rollers 86 may be cylindrical rods that extend a width of the segments 26, 30, 34, 38. A diameter of the secondary rollers 86 may be less than a diameter of the rollers 22.

Now referring to FIGS. 1-4, as the door belt 18 moves around the door frame 14, the plurality of openings 62 expose various ones of the plurality of segments 26, 30, 34, 38 in different configurations to create the various HVAC modes. The two-layer separation and three-inlet/two-outlet capability allows the door assembly 10 to direct airflow to accommodate three modes: all fresh mode, all recirculation mode, and two-layer mode (combination fresh and recirculation).

Figure 2:
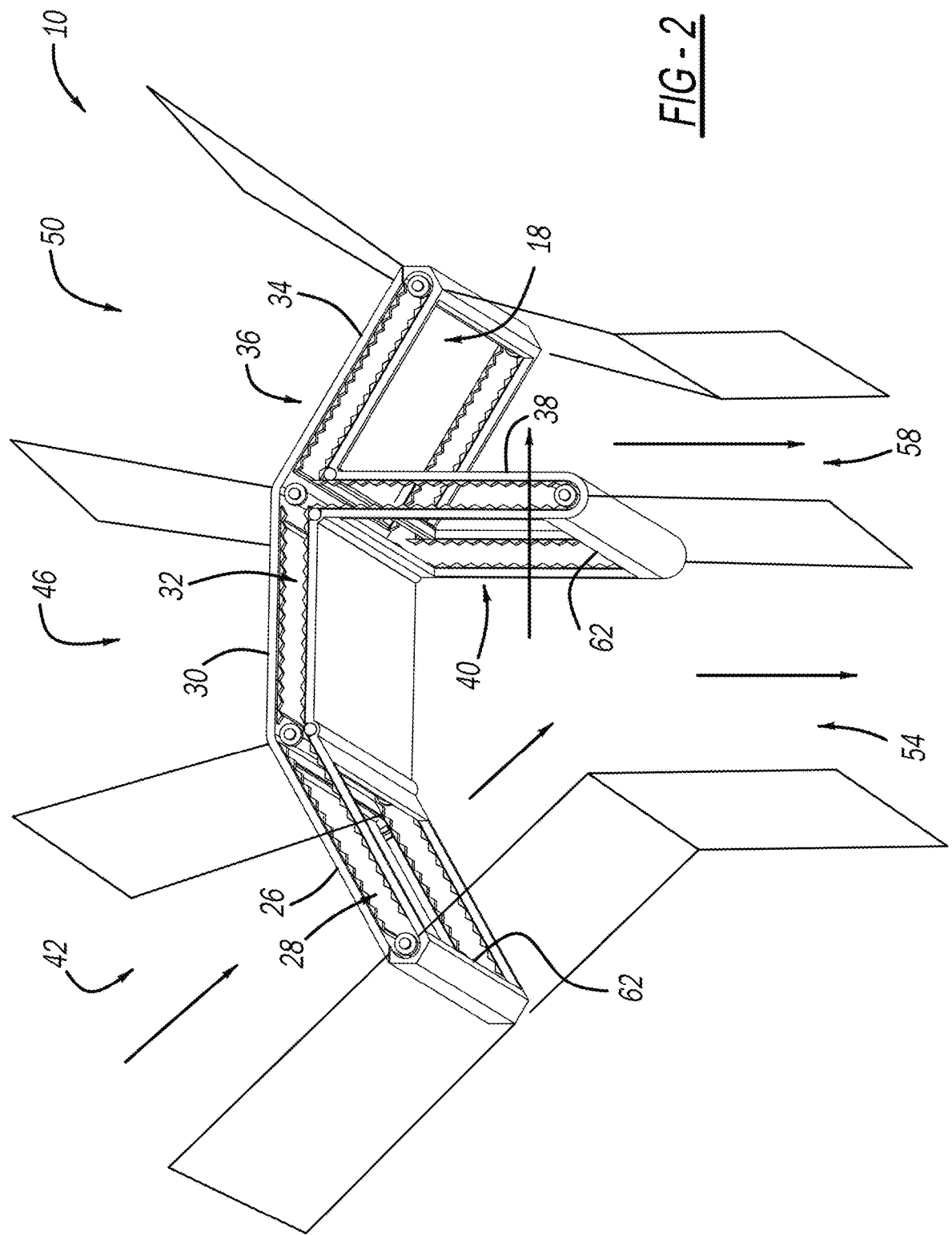
FIG. 2 is a perspective view of at least one example embodiment for the HVAC door assembly in FIG. 1 configured for an all fresh air HVAC mode according to the present disclosure.

In all fresh mode, cold, fresh air is provided to both the first output channel 54 and the second output channel 58. As illustrated in FIG. 2, the door belt 18 covers window 32 in segment 30 and window 36 in segment 34 to prevent communication between the first recirculation air channel 46 and the first output channel 54 and between the second recirculation air channel 50 and the second output channel 58, respectively. Openings 62 in the door belt 18 are aligned with window 28 in segment 26 and window 40 in segment 38 to permit communication between the fresh air channel 42 and the first output channel 54 and between the first output channel 54 and the second output channel 58, respectively. The window 40 in segment 38 may be open to allow mixing between the first output channel 54 and the second output channel 58. Thus, cold, fresh air is permitted to flow from the fresh air channel 42, through the window 28 in segment 26 to the first output channel 54, and from the first output channel 54 through the window 40 in segment 38 to the second output channel 58.

Figure 3:
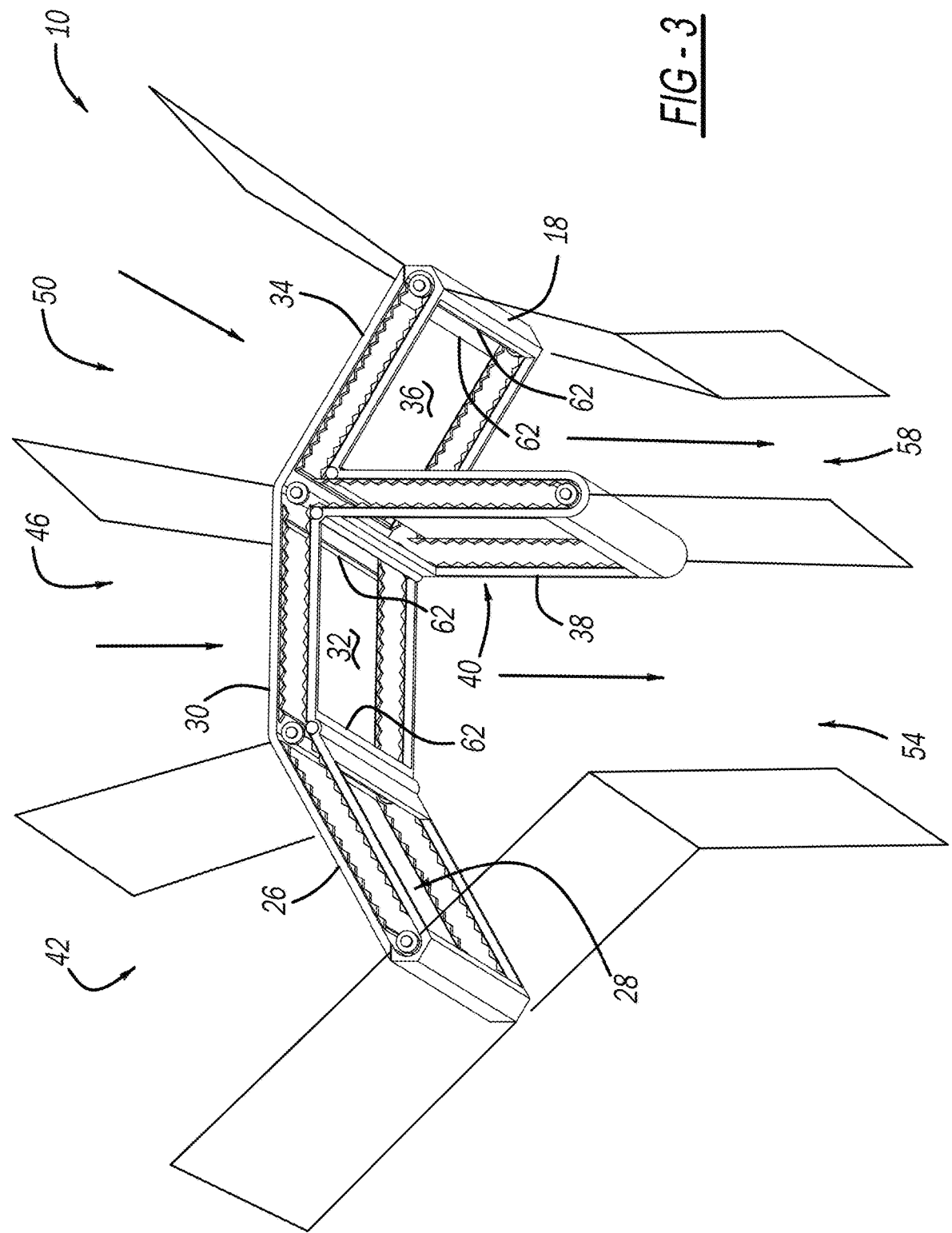
FIG. 3 is a perspective view of at least one example embodiment for the HVAC door assembly in FIG. 1 configured for an all recirculated HVAC mode according to the present disclosure.

Now referring to FIG. 3, in all recirculation mode, recirculated air is provided from first recirculation air channel 46 and the second recirculation air channel 50 to the first output channel 54 and the second output channel 58, respectively. The recirculated air may be cold recirculated air, warm (or hot) recirculated air, or mixed recirculated air. The segment 38 may or may not be open to allow mixing between the first output channel 54 and the second output channel 58.

As illustrated in FIG. 3, the door belt 18 covers window 28 in segment 26 and window 40 in segment 38 to prevent communication between the fresh air channel 42 and the first output channel 54 and between the first output channel 54 and the second output channel 58, respectively. Openings 62 in the door belt 18 are aligned with window 32 in segment 30 and window 36 in segment 34 to permit communication between the first recirculation air channel 46 and the first output channel 54 and between the second recirculation air channel 50 and the second output channel 58, respectively. Thus, recirculated air is permitted to flow from the first recirculation air channel 46 and the second recirculation air channel 50, through the window 32 in segment 30 and the window 36 in segment 34, respectively, and to the first output channel 54 and the second output channel 58, respectively.

Alternatively, the door belt 18 may cover window 28 in segment 26 to prevent communication between the fresh air channel 42 and the first output channel 54. Openings 62 in the door belt 18 may be aligned with window 40 in segment 38, window 32 in segment 30, and window 36 in segment 34 to permit communication between the first output channel 54 and the second output channel 58, between the first recirculation air channel 46 and the first output channel 54, and between the second recirculation air channel 50 and the second output channel 58, respectively.

Figure 4:
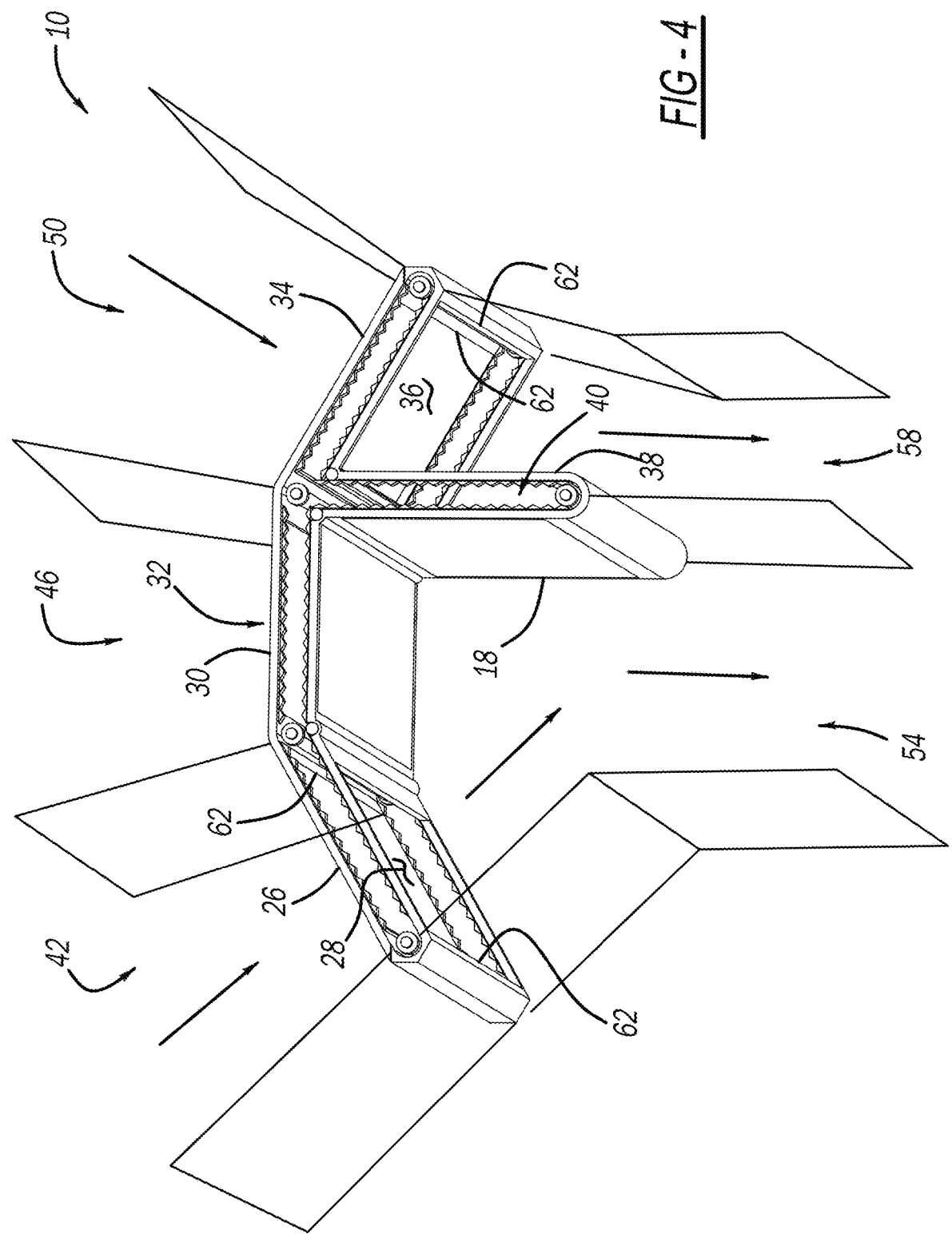
FIG. 4 is a perspective view of at least one example embodiment for the HVAC door assembly in FIG. 1 configured for a two-layer HVAC mode according to the present disclosure.

Now referring to FIG. 4, in the two-layer mode, cold, fresh air is provided from the fresh air channel 42 to the first output channel 54 and recirculated air is provided from the second recirculation air channel 50 to the second output channel 58. The segment 38 may or may not be open to allow mixing between the first output channel 54 and the second output channel 58.

As illustrated in FIG. 4, the door belt 18 covers window 32 in segment 30 and window 40 in segment 38 to prevent communication between the first recirculation air channel 46 and the first output channel 54 and between the first output channel 54 and the second output channel 58, respectively. Openings 62 in the door belt 18 are aligned with window 28 in segment 26 and window 36 in segment 34 to permit communication between the fresh air channel 42 and the first output channel 54 and between the second recirculation air channel 50 and the second output channel 58, respectively. Thus cold, fresh air is permitted to flow through the fresh air channel 42 through the window 28 in segment 26, and to the first output channel 54, and from the second recirculation air channel 50, through the window 36 in segment 34, and to the second output channel 58.

Alternatively, the door belt 18 may cover window 32 in segment 30 to prevent communication between the first recirculation air channel 46 and the first output channel 54. Openings 62 in the door belt 18 may be aligned with window 40 in segment 38, window 28 in segment 26, and window 36 in segment 34 to permit communication between the first output channel 54 and the second output channel 58, between the fresh air channel 42 and the first output channel 54, and between the second recirculation air channel 50 and the second output channel 58, respectively.

Figure 5:
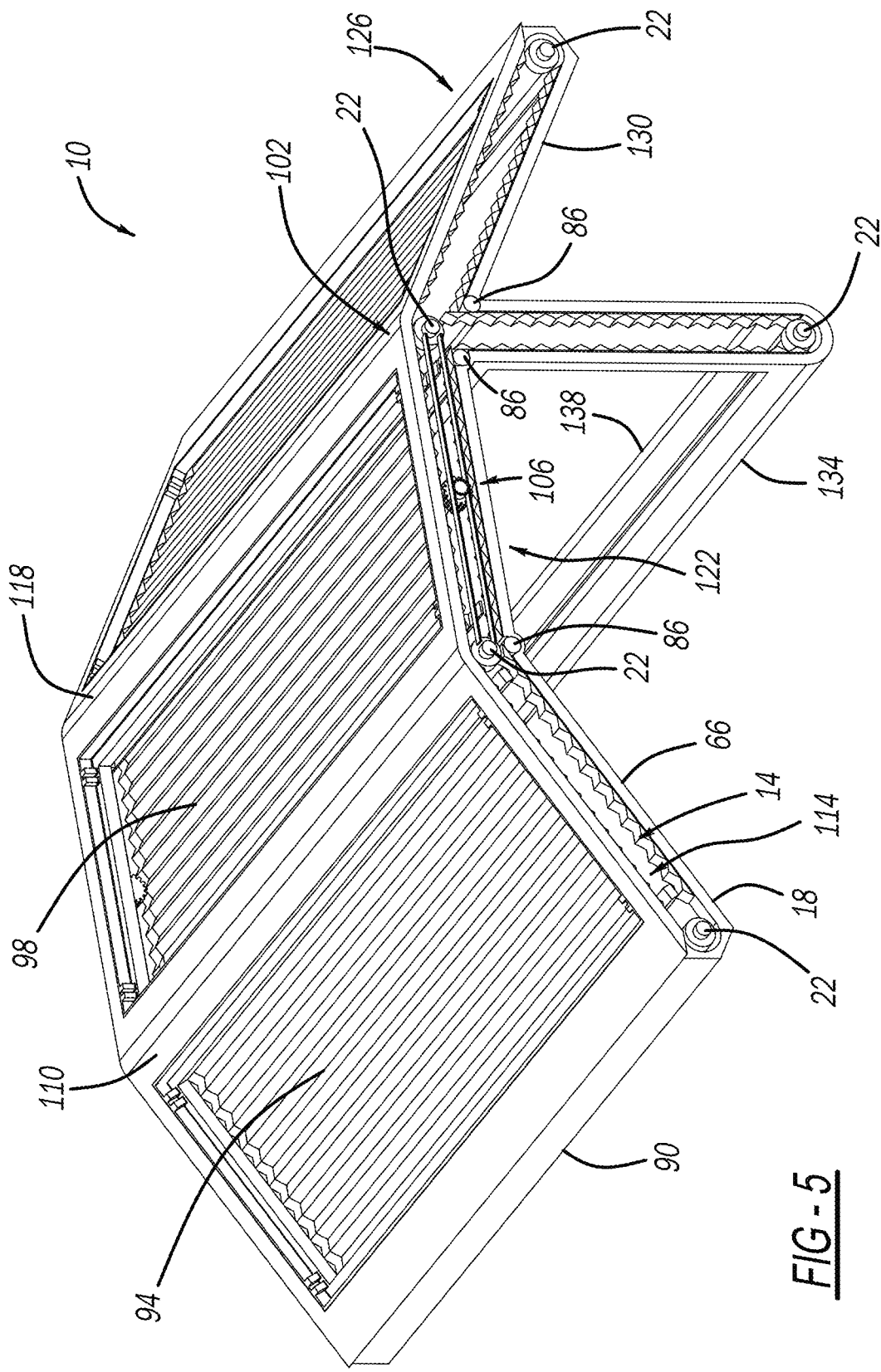
FIG. 5 is a perspective view of another example embodiment for an HVAC door assembly, where air filters are inserted inside the belt path, according to the present disclosure.

Now referring to FIG. 5, in at least one example embodiment, the door assembly 10 may additionally include a casing 90, filters 94, 98, 102, and/or a hard stop 106. The casing 90 may be disposed on an outside of the door frame 14 and may house the door frame 14, the track 66, the door belt 18, the rollers 22, and the secondary rollers 86. In at least one example embodiment the casing 90 may be formed of a moldable polymer (such as polypropylene or plastic), a metallic material (E.G., aluminum, 10, stainless steel, or the like), a combination of materials, or any other suitable material or combination thereof. In at least one example embodiment, the casing 90 may be formed by injection molding, blow molding, thermoforming, compression molding, vacuum casting, or any other polymer-forming process. In at least one example embodiment, the casing 90 may be formed by rolling, stamping, another metalworking procedure, or a combination of these.

The casing 90 may further include openings 110, 114, 118, 122, 126, 130, 134, 138 that align with the windows 28, 32, 36, 40, in segments 26, 30, 34, 38, respectively. For example, openings 110 and 114 may align on opposing sides of window 28 in segment 26, openings 118 and 122 may align on opposing sides of window 32 in segment 30, openings 126 and 130 may align on opposing sides of window 36 in segment 34, and openings 134 and 138 may align on opposing sides of window 40 in segment 38. The openings 110, 118, and 126 may support the filters 94, 98, 102, respectively. The filters 94, 98, 102 may be fixed within the respective opening 110, 118, 126. The filters 94, 98, 102 are each disposed parallel to a plane along which the door belt 18 travels adjacent to the filter 94, 98, 102 such that the filter 94, 98, 102 does not block the path of the door belt 18 as it moves from one roller 22 to the next roller 22. The filters 94, 98, 102 filter the air flowing into the first output channel 54 and the second output channel 58 from the fresh air channel 42 (filter 94), the first recirculation air channel 46 (filter 98), and the second recirculation air channel 50 (filter 102) by removing particles, dust, dirt, and debris that carry smells or would otherwise clog or gum up the FFCS components downstream from the door assembly 10. Thus the filters 94, 98, 102 may replace the current filter designs used in FFCS, thereby reducing packaging space for the FFCS. Additionally, use of filters 94, 98, 102 may increase FFCS part life and packaging life by providing clean fluid flow through the parts and packaging. In at least one example embodiment, the filters 94, 98, 102 may each be formed of paper, foam, cotton, metal, or any other suitable material or combination thereof.

In at least one alternative example embodiment not necessarily including the casing 90, the door assembly 10 may include the filters 94, 98, 102 integral with the door belt 18. For example, the filters 94, 98, 102 may be flexible filters fixed within the openings 62 in the door belt 18.

Figure 6:
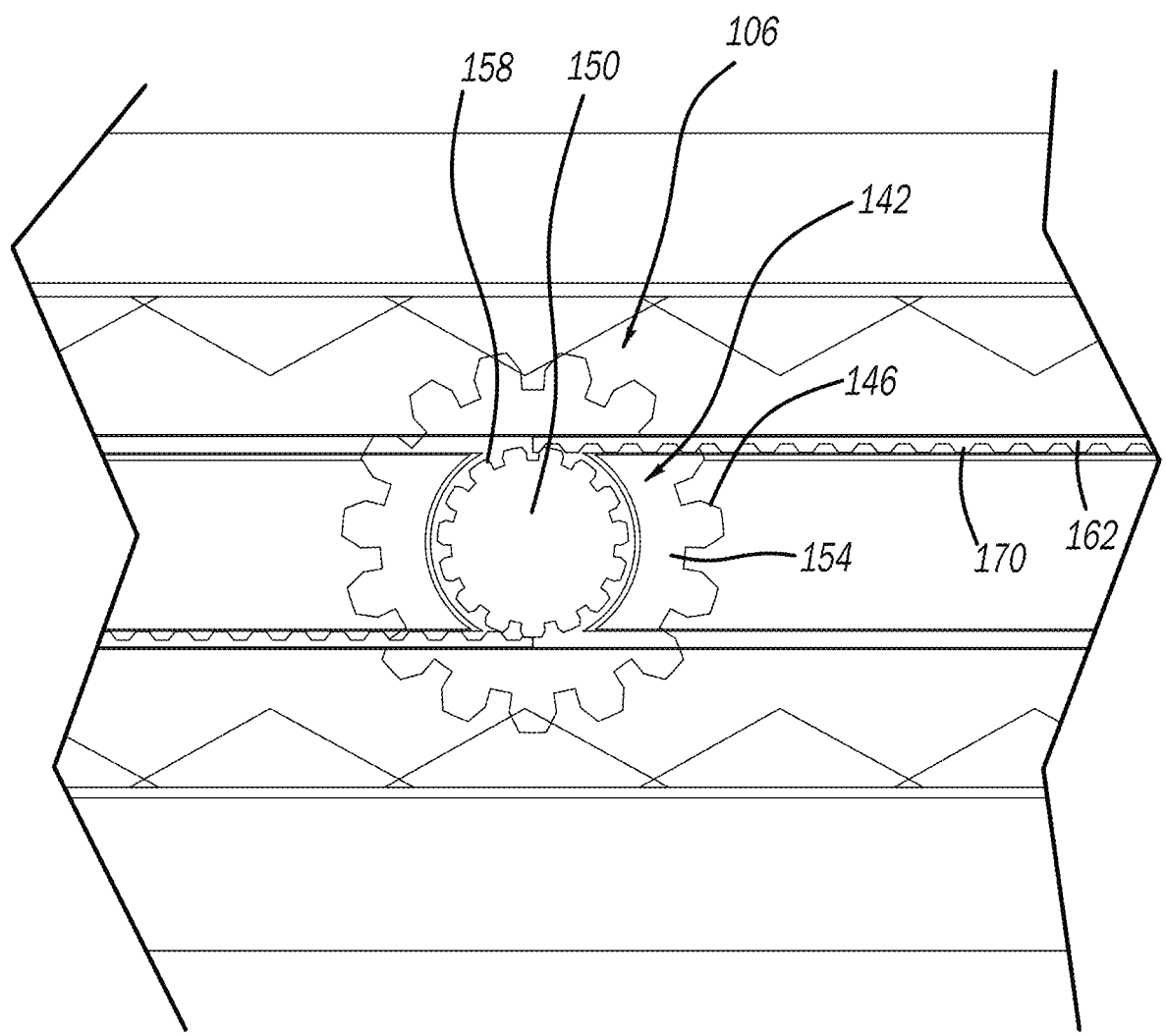
FIG. 6 is a detail view of an example embodiment of a hard stop of the HVAC door assembly in FIG. 5.
Figure 7:
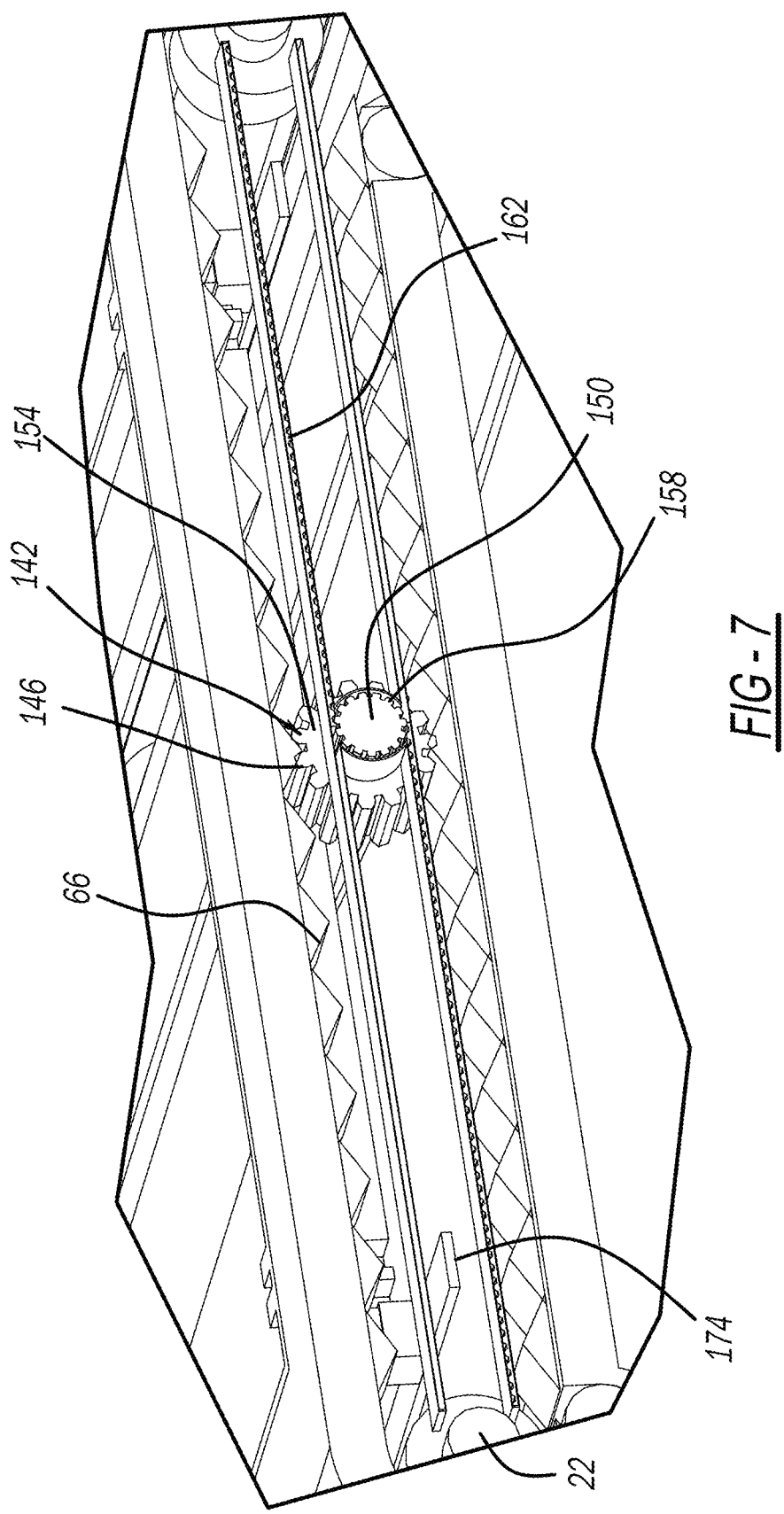
FIG. 7 is another detail view of an example embodiment of the hard stop of the HVAC door assembly in FIG. 5.

Now referring to FIGS. 5-7, in at least one example embodiment, the hard stop 106 may be a gear and may include a cylindrical rod 142 having teeth 146 around the circumference thereof. The hard stop 106 may be placed at a midpoint between the rollers 22 on the segment 30 and may engage the track 66 responsible for actuating the door belt 18. An additional gear 150 may extend or protrude from a face 154 of the cylindrical rod 142 along the same axis of rotation. The additional gear 150 may include teeth 158 around a circumference thereof.

The teeth 158 on the additional gear 150 may engage with a rack 162. The rack 162 may be fixed to a bottom surface 166 of the track 66 (or may be fixed to move with the track 66) and may include teeth 170 extending from the rack 162 in a direction opposite the track 66. The teeth 170 on the rack 162 may engage with the teeth 158 on the additional gear 150.

During operation, the rack 162 continues to move with the track 66 until the rack 162 contacts a wall 174 (or stop) that prevents further movement. The contact between the rack 162 and the wall 174 prevents the track 66 and door belt 18 from further movement. In at least one example embodiment, the wall 174 may be positioned at or near the roller 22. Alternatively, the wall 174 may be positioned anywhere along track 66. The position of the wall 174, a gear size of the additional gear 150, a length of the track 66, and a length of the rack 162 are designed such that when the door belt 18 moves through two modes (i.e., two of fresh mode, recirculation mode, and combination or two-layer mode) in one direction, the rack 162 will engage the wall 174, causing the track 66 to stop movement.

Alternatively, a stop could be created by placing a rod, slightly wider than the belt, inside the belt (spanning the width of the belt), and placing a protrusion in the form of a stop adjacent a gear, such that the rod will collide with the stop and prevent further travel of the belt.

Figure 8:
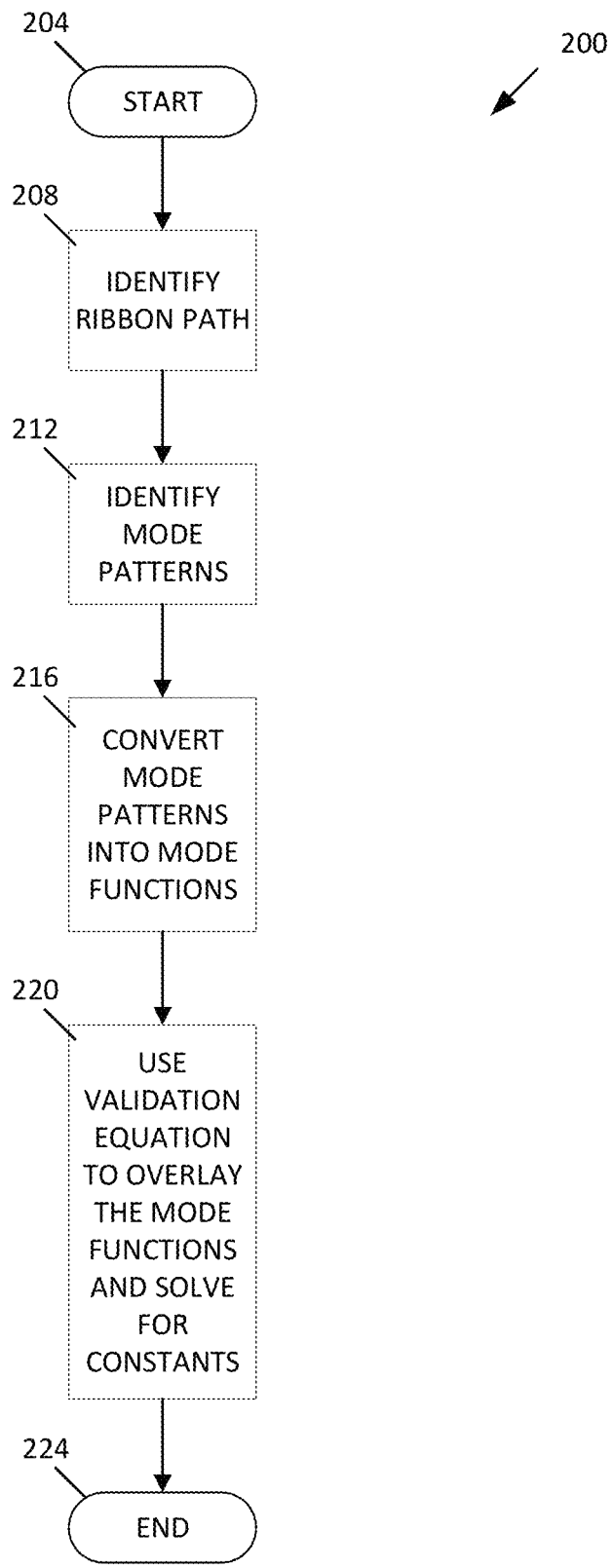
FIG. 8 is a flowchart illustrating at least one example embodiment a method for developing and validating at least one example embodiment of a door belt ribbon design according to the present disclosure.

Now referring to FIG. 8, at least one example embodiment of a flowchart for a method for developing and validating at least one example embodiment of a door belt 18 ribbon design according to the present disclosure is illustrated. Method 200 starts at 204. At 208 a ribbon path or door belt path is identified. Since the door belt 18 is flexible, the door belt 18 must be held in tension to maintain rigidity. As a result, the door belt path will usually be straight lines between waypoints or rollers 22. While the waypoint is illustrated and described as rollers 22 herein, it is understood that the waypoint may be static rods, rollers, gears, or any other object about which the door belt may bend. In a non-looping ribbon design, spooling waypoints or rollers 22 will be positioned at a start of the door belt path and an end of the door belt path. Waypoint or roller 22 placement is driven by placement of outlets, system boundaries, and locations where an FFCS mode will require a rib to be formed. Once the waypoints or rollers 22 are created, the door belt path will travel to each waypoint or roller 22. The space between the waypoints or rollers 22 will determine if the space will need to be controlled for the FFCS mode, or if the space can be uncontrolled.

At 212, FFCS mode patterns are identified. The requirements of an FFCS mode will dictate if the door belt 18 in front of an outlet should be open, closed, or partially closed. If dynamic ribbing is used in conjunction with the door belt 18, the FFCS mode pattern will also determine the length of the rib. Some areas may not need to be controlled by the FFCS mode pattern, because whether the door belt 18 is open, closed, or partially closed, the door belt 18 will not have an impact on the FFCS mode output. The areas not needing control are generally along the edges of the packaging where there is a solid wall. Once each area and the respective requirements (or lack thereof) have been found, the FFCS mode pattern of open, closed, or partially closed may be set along the door belt path.

Figure 9:
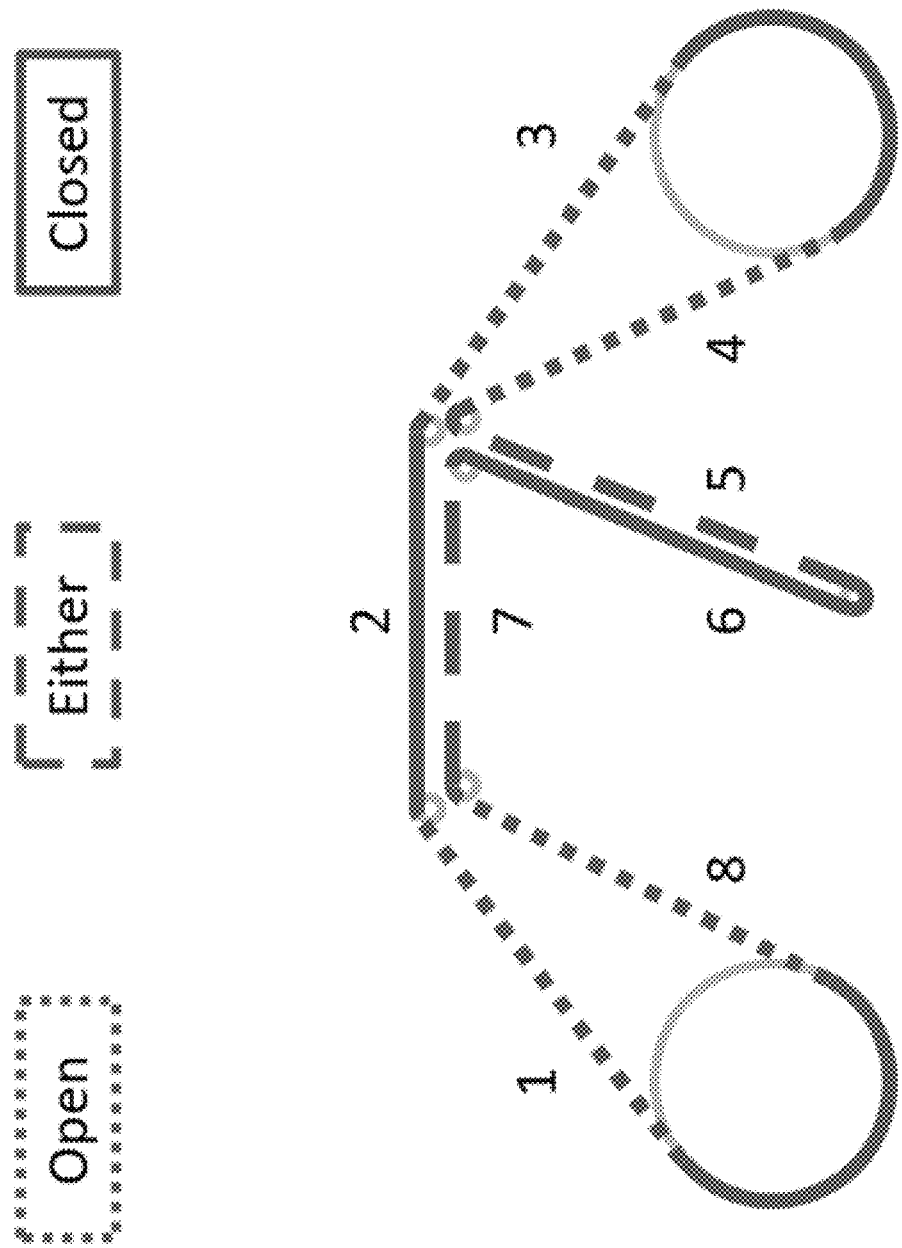
FIG. 9 is a schematic view of the door belt of FIG. 1, the door belt in FIG. 9 being divided into sections 1-8.

In at least one example embodiment illustrated in FIG. 9, the door belt 18 may be divided into sections 1-8, for example, aligning with segments 26, 30, 34, and 38 illustrated in FIG. 1. For the purposes of keeping the given example simple, it is assumed that sections 1-8 are of equal length with no extra space in between. However, it is understood that this method (and the example) could have sections of differing length or sections separated by extra space. It is further understood that this method may be applied to a door belt having any number of sections or lengths.

In the given example, the inlets and outlets may be the same as illustrated in FIG. 1. The various modes may be shown by the sections of the belt being open, closed, or either. As illustrated in the legend, the open sections are indicated by a dotted line, the closed sections are indicated by a solid line, and the sections that may be either opened or closed are indicated by a hyphened line.

Figure 10A:
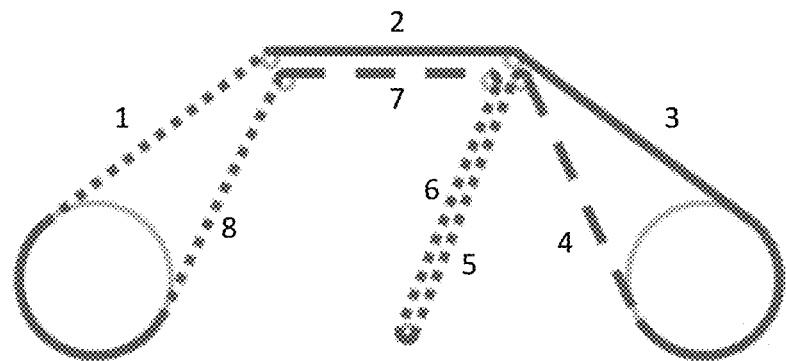
FIG. 10A is a schematic view of the door belt of FIG. 1, the door belt in FIG. 10A being in a first configuration for an all fresh HVAC mode.

For example, FIGS. 10A-10D illustrate the various configurations that correlate to the all fresh HVAC mode described and illustrated with respect to FIG. 2. As illustrated in FIG. 10A, the all fresh HVAC mode may be achieved when section 1 is open, section 2 is closed, section 3 is closed, section 4 is either open or closed, sections 5 and 6 are open, section 7 is either open or closed, and section 8 is open. This relationship may be represented by the following array:

| | | | | x = | | | | |
|---|---|---|---|---|---|---|---|---|
| | 1 | 2 | 3 | 4 | 5 | 6 | 7 | 8 |
| 10A = | −1 | 1 | 1 | 0 | −1 | −1 | 0 | −1 |

Figure 10B:
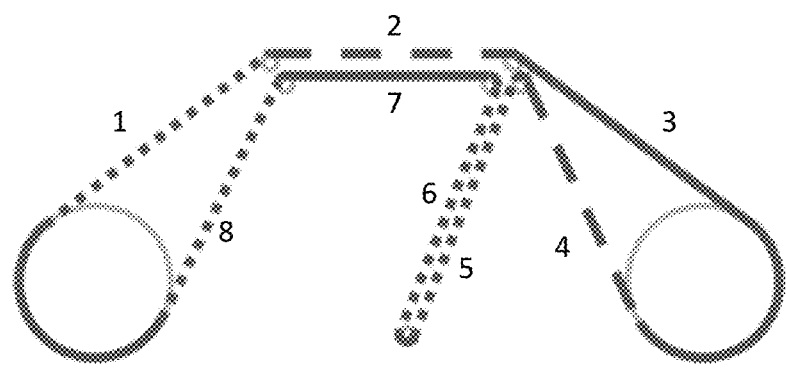
FIG. 10B is a schematic view of the door belt in FIG. 1, the door belt in FIG. 10B being in a second configuration for an all fresh HVAC mode.

As illustrated in FIG. 10B, the all fresh HVAC mode may also be achieved when section 1 is open, section 2 is either open or closed, section 3 is closed, section 4 is either open or closed, sections 5 and 6 are open, section 7 is closed, and section 8 is open. This relationship may be represented by the following array:

| | | | | x = | | | | |
|---|---|---|---|---|---|---|---|---|
| | 1 | 2 | 3 | 4 | 5 | 6 | 7 | 8 |
| 10B = | −1 | 0 | 1 | 0 | −1 | −1 | 1 | −1 |

Figure 10C:
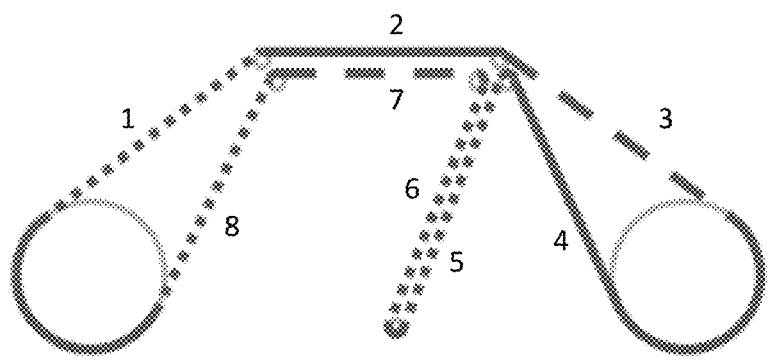
FIG. 10C is a schematic view of the door belt of FIG. 1, the door belt in FIG. 10C being in a third configuration for an all fresh HVAC mode.

As illustrated in FIG. 10C, the all fresh HVAC mode may also be achieved when section 1 is open, section 2 is closed, section 3 is either open or closed, section 4 is closed, sections 5 and 6 are open, section 7 is either open or closed, and section 8 is open. This relationship may be represented by the following array:

| | | | | x = | | | | |
|---|---|---|---|---|---|---|---|---|
| | 1 | 2 | 3 | 4 | 5 | 6 | 7 | 8 |
| 10C = | −1 | 1 | 0 | 1 | −1 | −1 | 0 | −1 |

Figure 10D:
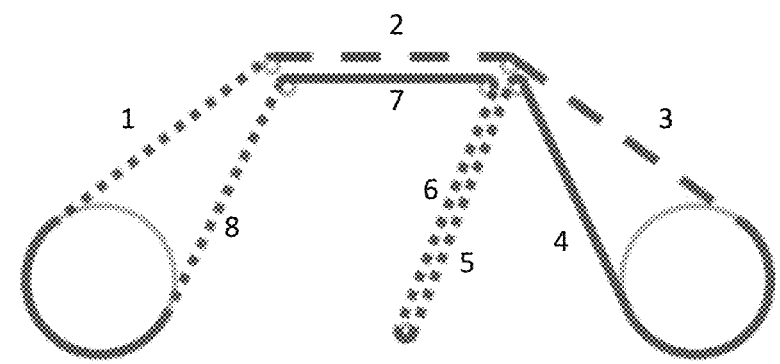
FIG. 10D is a schematic view of the door belt of FIG. 1, the door belt in FIG. 10D being in a fourth configuration for an all fresh HVAC mode.

As illustrated in FIG. 10D, the all fresh HVAC mode may also be achieved when section 1 is open, section 2 is either open or closed, section 3 is either open or closed, section 4 is closed, sections 5 and 6 are open, section 7 is closed, and section 8 is open. This relationship may be represented by the following array:

| | | | | x = | | | | |
|---|---|---|---|---|---|---|---|---|
| | 1 | 2 | 3 | 4 | 5 | 6 | 7 | 8 |
| 10D = | −1 | 0 | 0 | 1 | −1 | −1 | 1 | −1 |

Figure 11A:
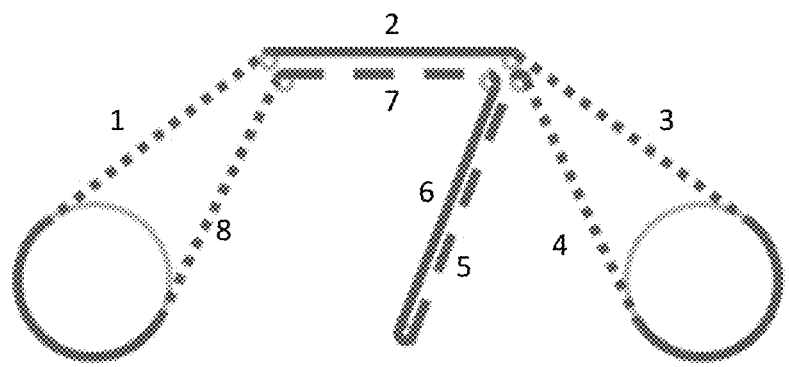
FIG. 11A is a schematic view of the door belt of FIG. 1, the door belt in FIG. 11A being in a first configuration for a two-layer HVAC mode.

For example, FIGS. 11A-11D illustrate the various configurations that correlate to the two-layer HVAC mode described and illustrated with respect to FIG. 4. As illustrated in FIG. 11A, the two-layer HVAC mode may be achieved when section 1 is open, section 2 is closed, sections 3 and 4 are open, section 5 is either open or closed, section 6 is closed, section 7 is either open or closed, and section 8 is open. This relationship may be represented by the following array:

| | | | | x = | | | | |
|---|---|---|---|---|---|---|---|---|
| | 1 | 2 | 3 | 4 | 5 | 6 | 7 | 8 |
| 11A = | −1 | 1 | −1 | −1 | 0 | 1 | 0 | −1 |

Figure 11B:
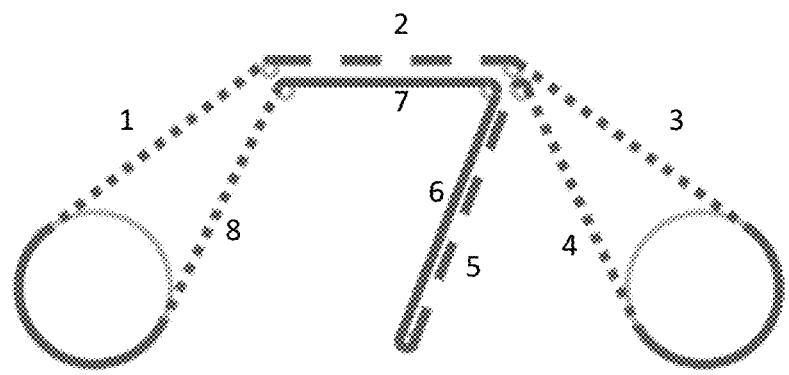
FIG. 11B is a schematic view of the door belt of FIG. 1, the door belt in FIG. 11B being in a second configuration for a two-layer HVAC mode.

As illustrated in FIG. 11B, the two-layer HVAC mode may also be achieved when section 1 is open, section 2 is either open or closed, sections 3 and 4 are open, section 5 is either open or closed, section 6 is closed, section 7 is closed, and section 8 is open. This relationship may be represented by the following array:

| | | | | x = | | | | |
|---|---|---|---|---|---|---|---|---|
| | 1 | 2 | 3 | 4 | 5 | 6 | 7 | 8 |
| 11B = | −1 | 0 | −1 | −1 | 0 | 1 | 1 | −1 |

Figure 11C:
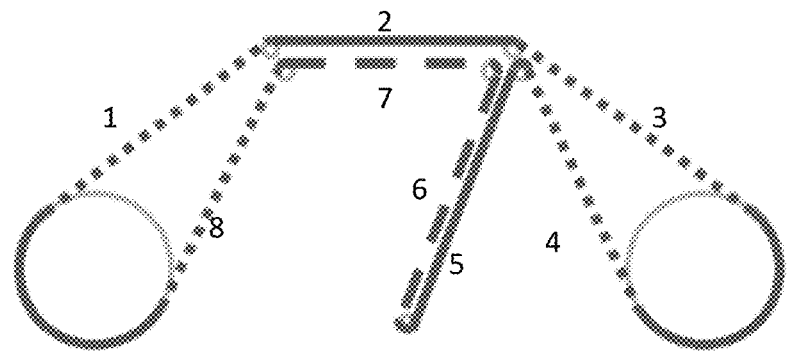
FIG. 11C is a schematic view of the door belt of FIG. 1, the door belt in FIG. 11C being in a third configuration for a two-layer HVAC mode.

As illustrated in FIG. 11C, the two-layer HVAC mode may also be achieved when section 1 is open, section 2 is closed, sections 3 and 4 are open, section 5 is closed, section 6 is either open or closed, section 7 is either open or closed, and section 8 is open. This relationship may be represented by the following array:

| | | | | x = | | | | |
|---|---|---|---|---|---|---|---|---|
| | 1 | 2 | 3 | 4 | 5 | 6 | 7 | 8 |
| 11C = | −1 | 1 | −1 | −1 | 1 | 0 | 0 | −1 |

Figure 11D:
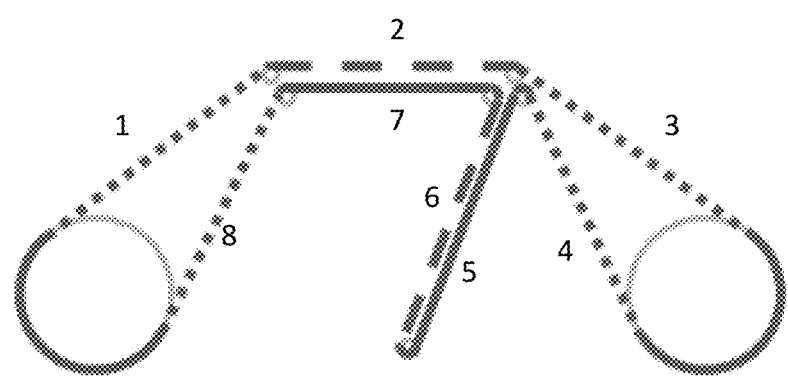
FIG. 11D is a schematic view of the door belt of FIG. 1, the door belt in FIG. 11D being in a fourth configuration for a two-layer HVAC mode.

As illustrated in FIG. 11D, the two-layer HVAC mode may also be achieved when section 1 is open, section 2 is either open or closed, sections 3 and 4 are open, section 5 is closed, section 6 is either open or closed, section 7 is closed, and section 8 is open. This relationship may be represented by the following array:

| | | | | x = | | | | |
|---|---|---|---|---|---|---|---|---|
| | 1 | 2 | 3 | 4 | 5 | 6 | 7 | 8 |
| 11D = | −1 | 0 | −1 | −1 | 1 | 0 | 1 | −1 |

Figure 12A:
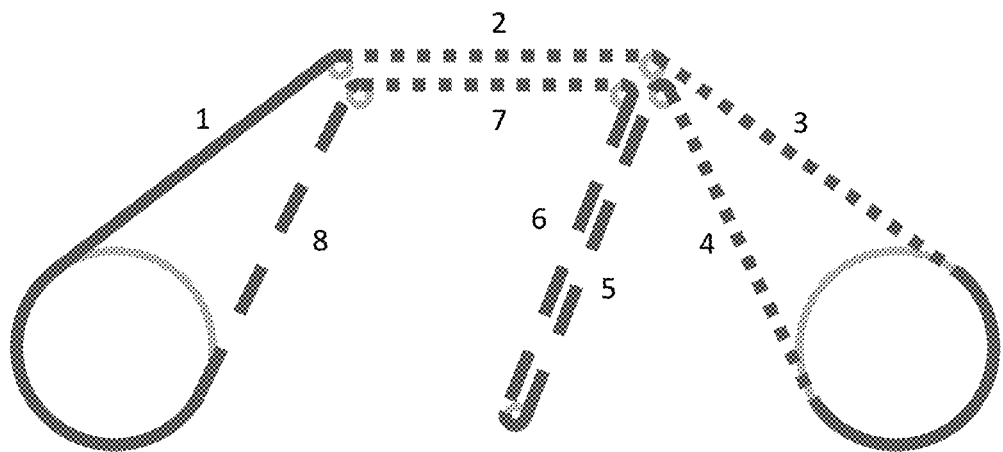
FIG. 12A is a schematic view of the door belt of FIG. 1, the door belt in FIG. 12A being in a first configuration for an all recirculation HVAC mode.
Figure 12B:
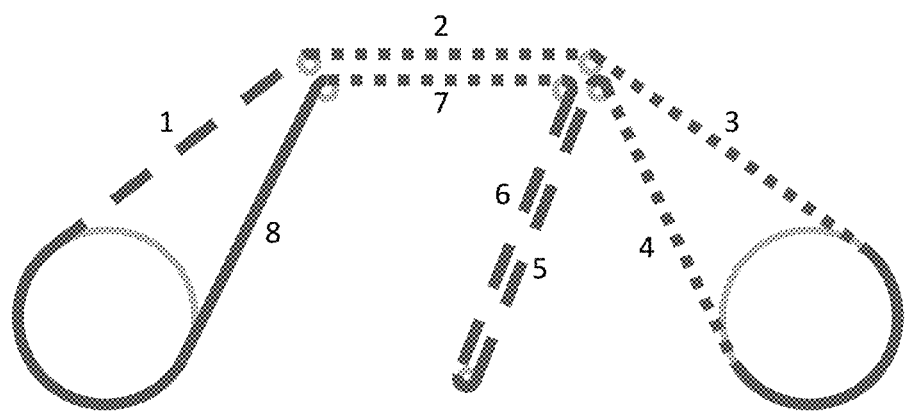
FIG. 12B is a schematic view of the door belt of FIG. 1, the door belt in FIG. 12B being in a second configuration for an all recirculation HVAC mode.

For example, FIGS. 12A and 12B illustrate the various configurations that correlate to the all recirculation HVAC mode described and illustrated with respect to FIG. 3. As illustrated in FIG. 12A, the all recirculation HVAC mode may be achieved when section 1 is closed, section 2 is open, sections 3 and 4 are open, sections 5 and 6 are either open or closed, section 7 is open, and section 8 is either open or closed. This relationship may be represented by the following array:

| | | | | x = | | | | |
|---|---|---|---|---|---|---|---|---|
| | 1 | 2 | 3 | 4 | 5 | 6 | 7 | 8 |
| 12A = | 1 | −1 | −1 | −1 | 0 | 0 | −1 | 0 |

As illustrated in FIG. 12B, the all recirculation HVAC mode may also be achieved when section 1 is either open or closed, section 2 is open, sections 3 and 4 are open, sections 5 and 6 are either open or closed, section 7 is open, and section 8 is closed. This relationship may be represented by the following array:

| | | | | x = | | | | |
|---|---|---|---|---|---|---|---|---|
| | 1 | 2 | 3 | 4 | 5 | 6 | 7 | 8 |
| 12B = | 0 | −1 | −1 | −1 | 0 | 0 | −1 | 1 |

In FIGS. 12A and 12B, if both inlets at sections 2 and 3 draw from the same source, the sections 2, 3, 4, and 7 of the door belt 18, which divided the system in the all fresh and two-layer HVAC modes, could be either open or closed. In the all recirculation HVAC mode, all inlets in play draw from the same source, and all outlets output air from the same source. If the all recirculation HVAC mode required specific ones of sections 2, 3, 4, and 7 to be open or closed for some other purpose of air flow control, then, the state of these sections 2, 3, 4, 7 would need to be controlled.

Thus, considering the various combinations of HVAC modes in FIGS. 9-12B, FIG. 13 combines the arrays for the different HVAC modes. As FIG. 13 illustrates, 4 all fresh mode combinations, 4 two-layer mode combinations, and 2 all recirculation mode combinations equates a total of 32 mode combinations.

Now referring to FIG. 8, at 216, the FFCS mode patterns are converted into FFCS mode functions. For example, on a door belt 18 with a non-looping ribbon pattern, a starting point of the FFCS mode function will be at a first end of the two spooling ends of the door belt 18. Alternatively, for a door belt 18 with a looping ribbon pattern, a starting point of the FFCS mode function may be any location along the door belt 18. In both the non-looping ribbon pattern and the looping ribbon pattern, the starting point of the FFCS mode function must be consistent across each FFCS mode. A function for FFCS mode logic for a looping ribbon pattern may be written as follows:

$$f(x) = \begin{cases} f(x), & 0 \le x \le n \\ f(x-n), & n < x \le 2n \end{cases}$$

whereas a function for FFCS mode logic for a non-looping ribbon pattern may be written as follows:

$$f(x) = \begin{cases} 0, & 0 \le x < \frac{L-n}{2} \\ f\left(x - \frac{L-n}{2}\right), & \frac{L-n}{2} \le x \le \frac{L+n}{2} \\ 0, & \frac{L+n}{2} < x \le L \end{cases}$$

where the following validation equation is true $$0 = \sum_{\alpha=1}^{\omega-1} \sum_{\beta=\alpha}^{\omega} \sum_{x=0}^{L} (f_\alpha(x+C_\alpha) * f_\beta(x+C_\beta) * |f_\alpha(x+C_\alpha) - f_\beta(x+C_\beta)|)$$

$$0 = \sum_{x=0}^{12} (f_1(x) * f_2(x) * |f_1(x) - f_2(x)|)$$

x=position on door belt in predetermined units of length
n=ribbon path length in units of length
ω=total number of modes
L=total ribbon length (looping=n|non-looping=n*(2ω−1))
ƒ(x)=function of HVAC mode logic at x
x=(must be open=−1|can be open or closed=0|must be closed=1)
α=mode α; $C_\alpha$=mode α at position constant offset
β=mode β; $C_\beta$=mode β at position constant offset A total length of the door belt path (either the starting point to an end point or a loop length) is represented by the variable "n". With "x" indicating a position on the door belt 18: where the FFCS mode pattern must be open, the FFCS mode function of x at that point will be equal to −1, where the FFCS mode pattern must be closed, the FFCS mode function of x at that point will be equal to 1, and where the FFCS mode pattern may be either open or closed, the FFCS mode function of x at that point will be equal to 0.

Figure 14:
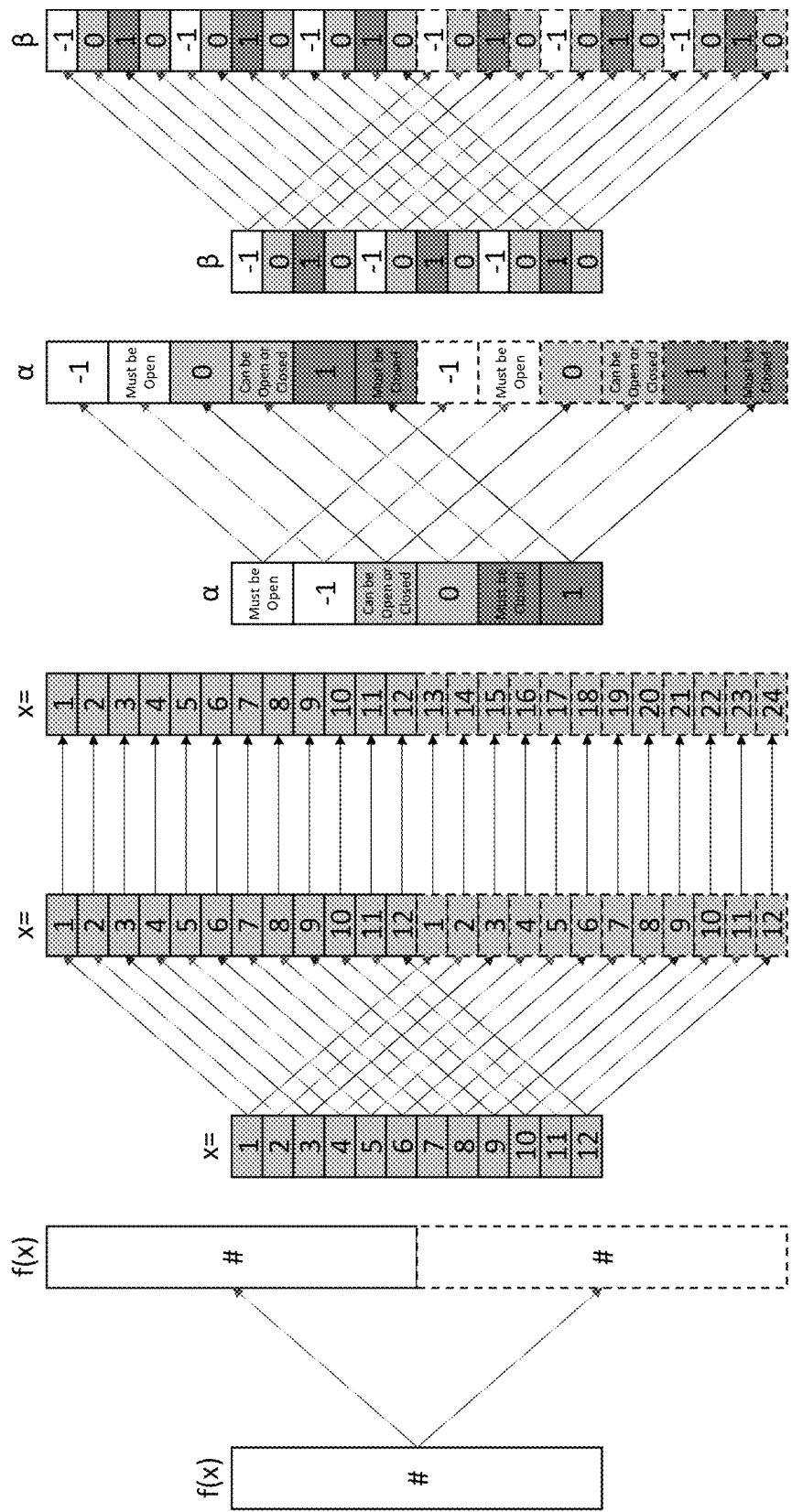
FIG. 14 is a chart repeating the FFCS mode function to create double a length (2*L) of the door belt from the chart in FIG. 13.

Referring additionally to FIG. 14, in a looping design, the FFCS mode function will be repeated to make it double a length of the door belt 18. Repeating the FFCS mode function will allow the FFCS mode function to be offset any constant amount between 0 and "n." All but a first of the FFCS modes will need an offset.

Alternatively, in a non-looping design, the door belt 18 will have a blank space added to a beginning of the door belt 18 and an end of the door belt 18. The blank spaces make the overall length of the door belt 18 equal to double a door belt path length multiplied by the number of FFCS modes. The overall length of the door belt 18 accounts for the possibility that all of the FFCS modes are in any order and may have no overlap between them. As a result, the non-looping design will always have a solution but may not always be efficient.

Figure 17:
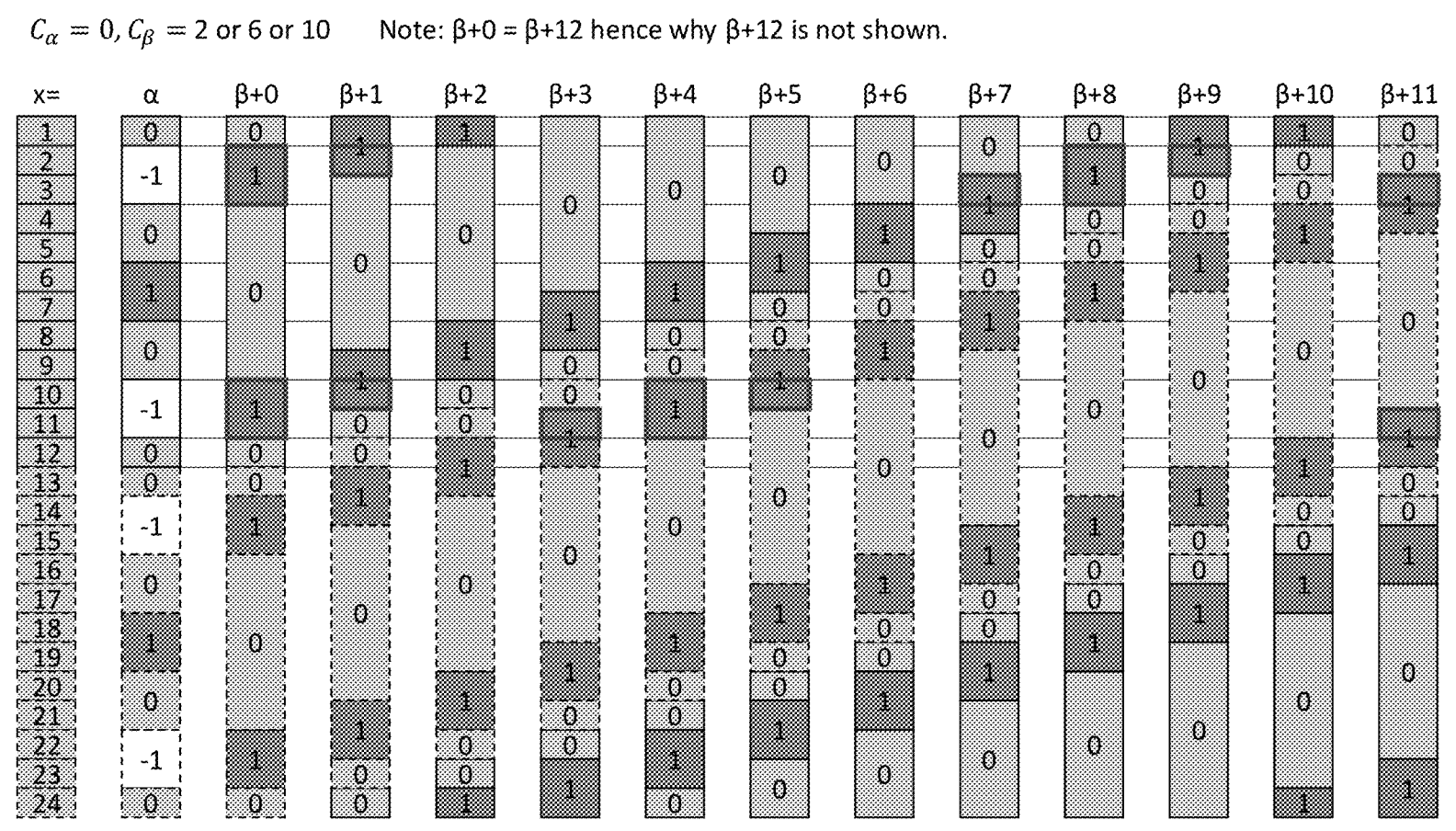
Figure 20:
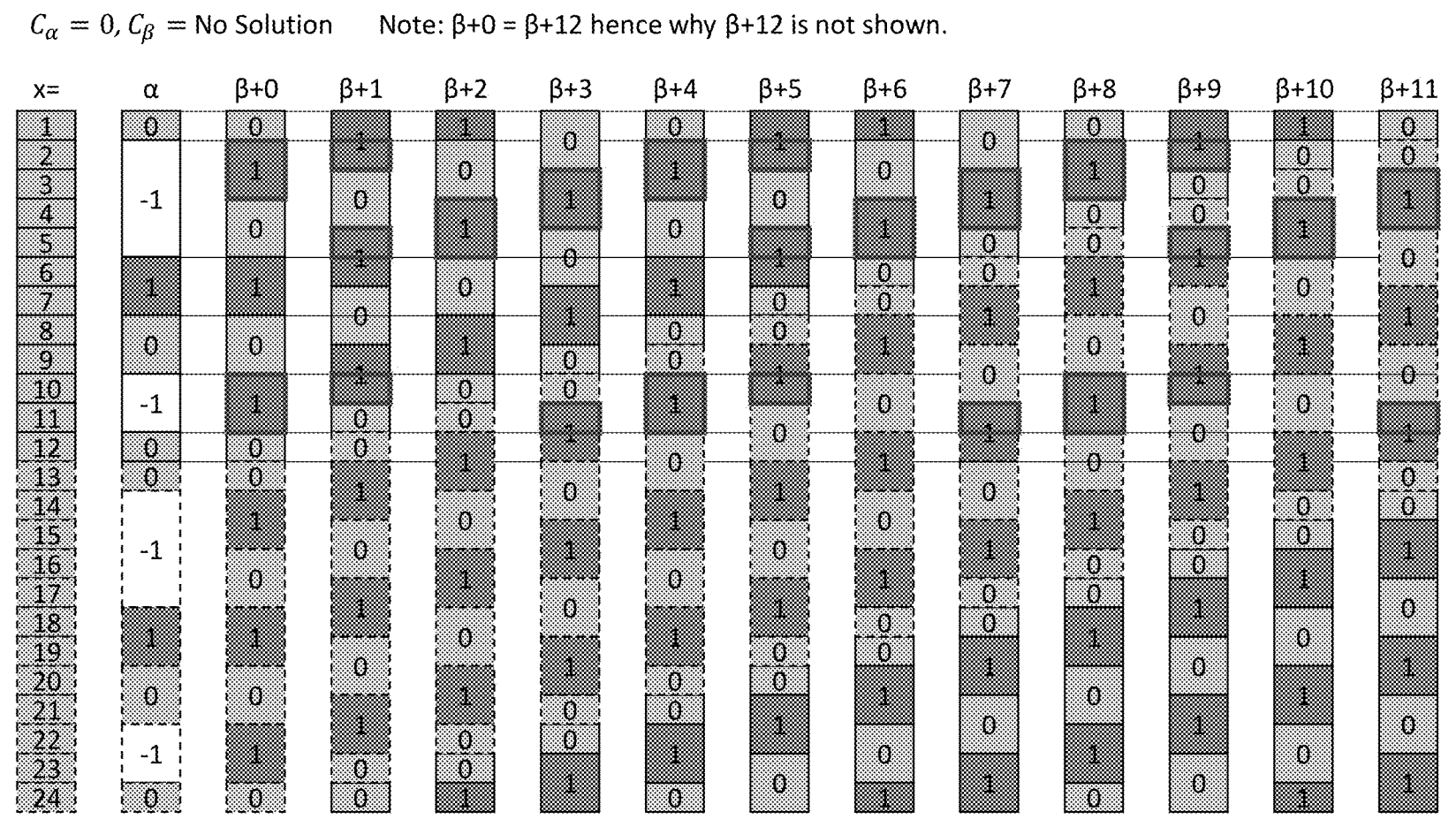

Referring back to FIG. 8, at 220, the validation equation (FIG. 15 and above) is used to overlay the FFCS mode functions and solve for constants. Appropriately selected valid offset values make the validation equation equal to 0. The validation equation sums the comparison results for the values of each function at all positions "x". At locations "x" where either [all FFCS modes could be either (0) or must be open (−1)], or [all HAVC modes could be either (0) or must be closed (1)], the comparison returns 0 to add to the sum (FIG. 16). If at any given "x" any FFCS mode must be open (−1) and another FFCS mode must be closed (1), the comparison returns −2 to add to the sum (FIG. 17). The −2 comparison return makes the end result of the validation equation equal to a non-zero value. Any set of offset values that make the validation equation return a zero result are valid (FIG. 18). Not all combinations of FFCS modes will have a valid set of offsets. In these cases, a door belt cannot be designed using the given FFCS modes, waypoints, and door belt type (for example, FIGS. 19 and 20).

A single ribbon door belt design is able to complete the validation equation process using a single scale for "x". To properly analyze a multi-ribbon door belt design, each additional ribbon must be scaled by the ratio of that ribbon's movement speed relative to the main ribbon's movement speed. For example, if the multiple ribbons in the door belt 18 are connected through a 1:1 gear ratio, then a distance represented by "x" for one ribbon will be the same distance on a secondary ribbon. In a situation where the ribbons have a 1:2 gear ratio, the value of "x" for the main ribbon, will be half the value of "x" on the secondary ribbon. The same scaling will be applied to the constant offset for each FFCS mode.

Figure 21:
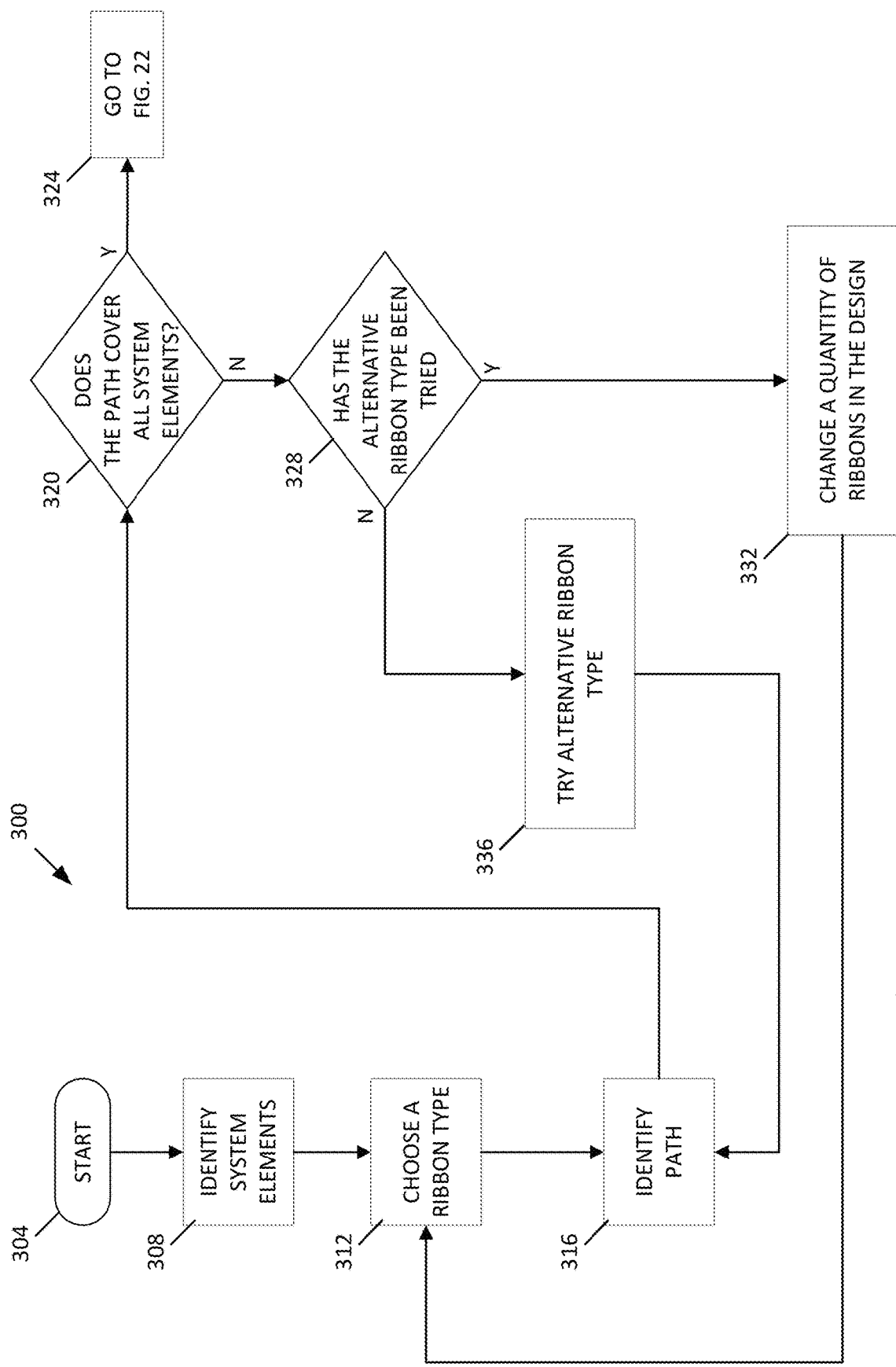
FIG. 21 is a flowchart illustrating at least one example embodiment of a method for developing and validating at least one example embodiment of a door belt ribbon design according to the present disclosure.

Now referring to FIG. 21, at least one example embodiment of another flowchart for a method 300 of developing and validating at least one example embodiment of a door belt 18 ribbon design according to the present disclosure is illustrated. Method 300 starts at 304.

At 308, the system elements are identified. The system elements include the inlets, the outlets, and the system boundaries. In at least one example embodiment, the system elements may include the fresh air channel 42, the first recirculation air channel 46, the second recirculation air channel 50, the first output channel 54, the second output channel 58, and the HVAC system surfaces.

At 312, a ribbon type is selected. As previously described, the ribbon type may be a looping ribbon or a non-looping ribbon. In at least one example embodiment, the looping ribbon may be designed such that a start and an end of the door belt 18 are attached, and the door belt 18 can travel endlessly in either direction. In at least one alternative example embodiment, the non-looping ribbon may be designed where a first end and a second end of the door belt 18 are not connected. In the non-looping ribbon design, the door belt 18 spools at the waypoints or rollers 22 at the first end, the second end, or both the first end and the second end. A key difference between the looping ribbon design and the non-looping ribbon design is that the non-looping ribbon design can be flexible in its design length, whereas the looping ribbon design's length is determined by the door path length.

At 316, a door belt path is identified. In at least one example embodiment, a route is determined that reaches each inlet, each outlet, and each rib, where applicable. For example, the inlets may include the fresh air channel 42, the first recirculation air channel 46, and the second recirculation air channel 50, previously described. For example, the outlets may include the first output channel 54 and the second output channel 58, previously described.

At 320, whether the door belt path covers all system elements is determined.

If true at 320, method 300 moves to FIG. 22 (discussed below) at 324. If false at 320, whether the alternative ribbon type has been tried is determined at 328. For example, if the looping ribbon type is selected at 312, the method 300 determines whether the non-looping ribbon type has been tried, and if the non-looping ribbon type is selected at 312, the method 300 determines whether the looping ribbon type has been tried.

If true at 328, a quantity of ribbons in the ribbon design is changed at 332. For example, if the ribbon design is a single ribbon, the design includes only one (a single), continuous ribbon. Thus, at 332, the single ribbon design may be changed to a multi-ribbon design which includes two or more continuous ribbons. If the ribbon design is a multi-ribbon design, a single ribbon may be added or taken away from the design. Method 300 then returns to 312.

If false at 328, the alternative ribbon type is selected at 336. For example, if the looping ribbon type is selected at 312, the method 300 selects the non-looping ribbon type at 336, and if the non-looping ribbon type is selected at 312, the method 300 selects the looping ribbon type at 336. Method 300 then returns to 316.

Figure 22:
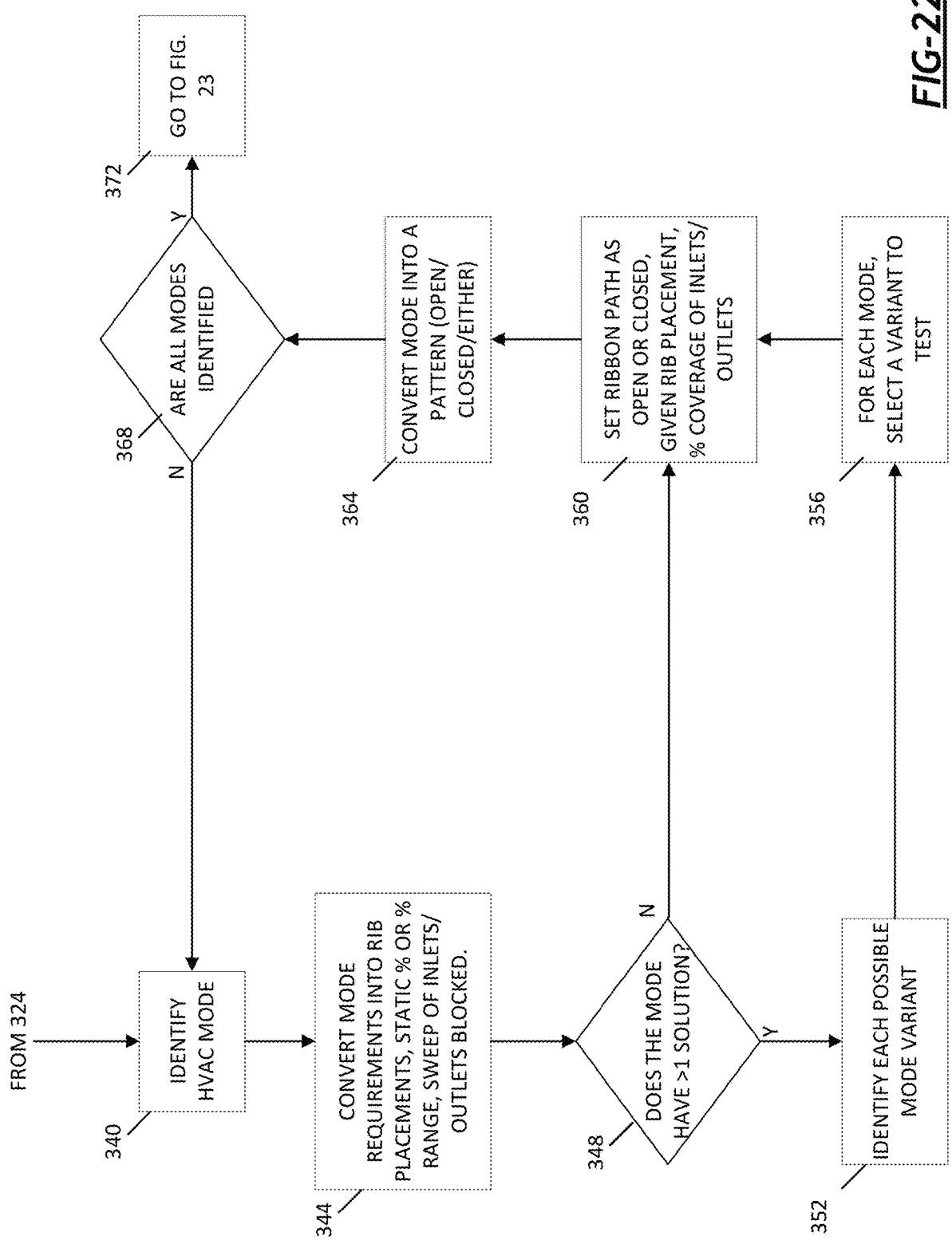
FIG. 22 is a continuation of the flowchart illustrated in FIG. 21.

Now referring to FIG. 22, at 340 an FFCS mode is identified. In at least one example embodiment, the FFCS mode may be one of all fresh, two-layer, or all recirculation, as previously discussed.

At 344, the FFCS mode requirements are converted into rib placements and static percentage (%) or percent (%) range of the inlets and/or outlets blocked. For example, ribs include surface texture on an inside wall of the housing or packaging. In at least one example embodiment, the surface texture may include diamond-shaped ribbing, diagonal ribbing, cross ribbing, or any other shaped ribbing or surface texture to direct fluid flow. Additionally, in at least one example embodiment, the inlets and/or outlets may be fully blocked or partially blocked (for example, any range from 0-100% blocked) by the door belt 18.

At 348, the method 300 determines whether the FFCS mode has greater than one solution. For example, the all fresh mode may have mode variants, or solutions, as previously described with respect to FIGS. 10A-10D. The two-layer mode may have mode variants, or solutions, as previously described with respect to FIGS. 11A-11D. The all recirculation mode may have mode variants, or solutions, as previously described with respect to FIGS. 12A-12B.

If true at 348, each possible mode variant is identified at 352. In at least one example embodiment, the mode variants may be the mode variants previously described with respect to FIGS. 10A-12B. If false at 348, method 300 moves to 360 (described below).

At 356, a variant to test for each mode is selected. For example, if the FFCS mode was identified as the all fresh mode at 340, one of the variants in FIGS. 10A-10D is selected to test. If the FFCS mode was identified as the two-layer mode at 340, one of the variants in FIGS. 11A-11D is selected to test. If the FFCS mode was identified as the all recirculation mode at 340, one of the variants in FIGS. 12A-12B is selected to test.

At 360, a ribbon path is set as open or closed given rib placement and the percent (%) coverage of inlets and/or outlets. In at least one example embodiment, if the FFCS mode was identified as the all fresh mode at 340 and the variant in FIG. 10A is selected to test, the ribbon path would be set according to the following: section 1 is open, section 2 is closed, section 3 is closed, section 4 is either open or closed, sections 5 and 6 are open, section 7 is either open or closed, and section 8 is open. While the ribbon path is described with sections 1-8 being open, closed, or either open or closed for simplicity, it is understood that sections 1-8, for a given mode, may be partially open or closed (for example, within a range of 0-100% open or closed).

At 364, the FFCS mode is converted into a pattern. For example, the pattern may be open, closed, or either. In at least one example embodiment, in the example where the HVAC mode was identified as the all fresh mode at 340 and the variant in FIG. 10A is selected to test, the pattern would be set according to the following:

| | | | | x = | | | | |
|---|---|---|---|---|---|---|---|---|
| | 1 | 2 | 3 | 4 | 5 | 6 | 7 | 8 |
| 10A = | −1 | 1 | 1 | 0 | −1 | −1 | 0 | −1 | where −1 is open, 1 is closed, and 0 is either open or closed, to match the ribbon path set at 360. While the ribbon path is described with sections 1-8 being open, closed, or either open or closed for simplicity (using −1, 0, 1), it is understood that sections 1-8, for a given mode, may be partially open or closed (for example, within a range of 0-100% open or closed). If an opening needs to be partially open (less than 100% open, but not 100% closed) the transition between open and close will be some value X in between the values of X that are at either end of the opening. To better visualize this, the scale of the units X can be changed so that this transition point is represented by an integer X.

At 368, the method 300 determines whether all FFCS modes have been identified. For example, if the FFCS mode was identified as the all fresh mode at 340 and the variant in FIG. 10A was selected to test at 356, all FFCS modes may not have been identified, and a two-layer mode or an all recirculation mode may be selected for evaluation. If false at 368, method 300 returns to 340 and identifies a different FFCS mode. If true at 368, method 300 moves to FIG. 23 at 372.

Figure 23:
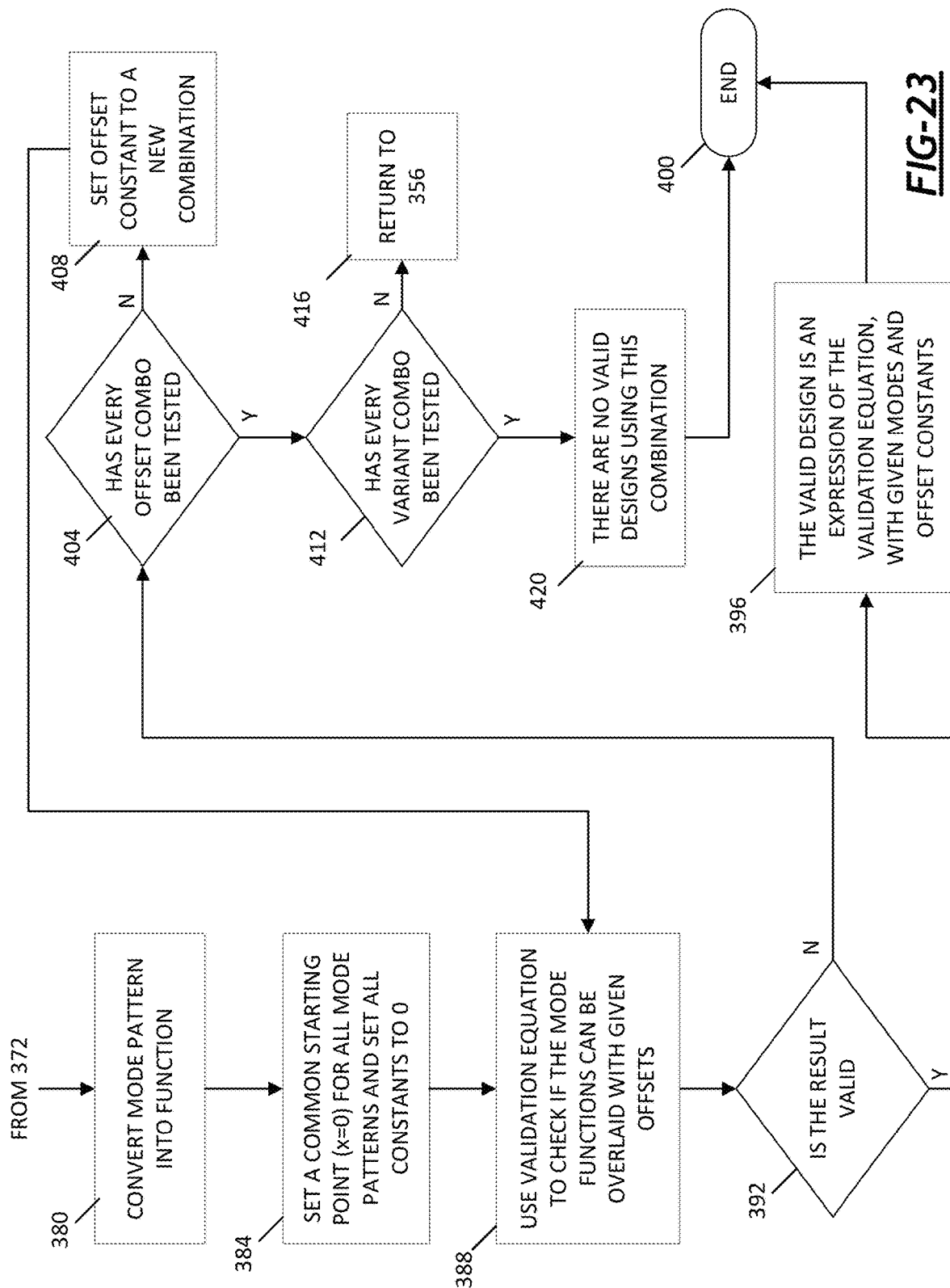
FIG. 23 is a continuation of the flowcharts illustrated in FIGS. 21 and 22.

Now referring to FIG. 23, at 380 the mode pattern is converted into a function. On a door belt 18 with a non-looping ribbon pattern, a starting point of the FFCS mode function will be at a first end of the two spooling ends of the door belt 18. For a door belt 18 with a looping ribbon pattern, a starting point of the FFCS mode function may be any location along the door belt 18. In both the non-looping ribbon pattern and the looping ribbon pattern, the starting point of the FFCS mode function must be consistent across each FFCS mode. A function for FFCS mode logic for a looping ribbon pattern may be written as follows:

$$f(x) = \begin{cases} f(x), & 0 \le x \le n \\ f(x-n), & n < x \le 2n \end{cases}$$

whereas a function for FFCS mode logic for a non-looping ribbon pattern may be written as follows:

$$f(x) = \begin{cases} 0, & 0 \le x < \dfrac{L-n}{2} \\ f\left(x - \dfrac{L-n}{2}\right), & \dfrac{L-n}{2} \le x \le \dfrac{L+n}{2} \\ 0, & \dfrac{L+n}{2} < x \le L \end{cases}$$

A total length of the door belt path (either the starting point to an end point or a loop length) is represented by the variable "n". A total ribbon length is represented by "L". With "x" indicating a position on the door belt 18: where the FFCS mode pattern must be open, the FFCS mode function of x at that point will be equal to −1, where the FFCS mode pattern must be closed, the FFCS mode function of x at that point will be equal to 1, and where the FFCS mode pattern may be either open or closed, the FFCS mode function of x at that point will be equal to 0.

At 384, a common starting point for all mode patterns is set and all constants are set to zero (0). For example, x=0 may be set as a common starting point for all mode patterns. Additionally referring to FIG. 24 as an example, the modes/variants that may be converted into a function may be the modes/variants in FIGS. 10A, 11A, and 12A, as previously discussed.

At 388, the validation equation is used to check whether the mode functions may be overlaid with the given offsets. In at least one example embodiment, the previously described validation equation (above and FIG. 15) will equal zero (0) when appropriately selected offset values are applied. The validation equation sums the comparison results for the values of each function at all positions "x". At locations "x" where either [all FFCS modes could be either (0) or must be open (−1)], or [all HAVC modes could be either (0) or must be closed (1)], the comparison returns 0 to add to the sum. If at any given "x" any FFCS mode must be open (−1) and another FFCS mode must be closed (1), the comparison returns −2 to add to the sum. The −2 comparison return makes the end result of the validation equation equal to a non-zero value.

Additionally referring to FIGS. 25-27 as an example, the modes/variants that may be validated using the validation equation may be the modes/variants in FIGS. 10A, 11A, and 12A, as previously discussed. In FIG. 25, the offset for the α mode is set to zero (0) and a version of each offset of the β mode is set to zero (0). For each section of each offset of the β mode, the β mode is compared to the section of the α mode. A valid offset will result in a comparison where each section has either the same value on both α and β, or one of the sections has a zero (0) value. In the example of FIG. 25, the valid constants are $C_β=3$. The mode in FIG. 10A and the mode in FIG. 11A are valid when $C_{2A}=C_{1A}+3$.

Following the same procedure as in FIG. 25, in the example of FIG. 26, the valid constants are $C_β=6$. The mode in FIG. 10A and the mode in FIG. 12A are valid when $C_{3A}=C_{1A}+6$. Likewise, following the same procedure as in FIG. 25, in the example of FIG. 27, the valid constants are $C_β=3$ and 7. The mode in FIG. 11A and the mode in FIG. 12A are valid when $C_{3A}=C_{2A}+3$, 7.

Referring back to FIG. 23, at 392, the mode 300 determines whether the result is valid. Appropriately selected valid offset values make the validation equation equal to 0. Any set of offset values that make the validation equation return a zero result are valid. If the end result of the validation equation is a non-zero number, the offset values are not valid. Not all combinations of FFCS modes will have a valid set of offsets.

For example, referring back to FIGS. 25-27, the valid solutions for the modes/variants from FIGS. 10A, 11A, and 12A were $C_{2A}=C_{1A}+3$, $C_{3A}=C_{1A}+6$, and $C_{3A}=C_{2A}+3$, 7. Populating these in the validation equation results in the following:

$$C_{3A}=(C_{2A})+3=(C_{1A}+3)+3=C_{1A}+6$$

$$C_{3A}=(C_{2A})+7=(C_{1A}+7)+3\neq C_{1A}+6$$

Note that when x>L:

$$C+X=C+(X-L)$$

$$C_{1A}+10=C_{1A}+(10-8)=C_{1A}+2$$

$$\omega=C_{1A}=0, C_{2A}=3, C_{3A}=6$$

Accordingly, the following is valid:

| | x | | | | | | | |
|---|---|---|---|---|---|---|---|---|
| | 1 | 2 | 3 | 4 | 5 | 6 | 7 | 8 |
| $C_{1A}=0$ | −1 | 1 | 1 | 0 | −1 | −1 | 0 | −1 |
| $C_{2A}=3$ | −1 | 0 | 1 | 0 | −1 | −1 | 1 | −1 |
| $C_{3A}=6$ | −1 | 0 | 1 | −1 | −1 | −1 | 0 | 0 |
| Ω = | −1 | 1 | 1 | −1 | −1 | −1 | 1 | −1 |

If true at 392, the design is valid at 396. The valid design is an expression of the validation equation, with given modes and offset constants. In at least one example embodiment, when the validation equation includes inputs of constants $C_{1A}=0$, $C_{2A}=3$, $C_{3A}=6$ for the variants/modes discussed in FIGS. 10A, 11A, and 12A, the mathematical expression results in the shown valid design. The resulting valid design may be only a first valid design. The validation equation additionally expresses any other solutions when given alternate inputs. As a result, all valid designs may be expressed by solutions to the equation.

While the first solution is a valid design, it is understood that the first solution may not be the most efficient (with regard to travel distance) in achieving all FFCS modes. For example, the distance between the FFCS modes may be 3 units between the all fresh mode illustrated in FIG. 10A and the two-layer mode illustrated in FIG. 11A, and the distance may be 3 more units between the two-layer mode illustrated in FIG. 11A and the all recirculation mode illustrate in FIG. 12A. Thus, there may be a total of 6 units of distance to travel across each FFCS mode. However the all fresh mode illustrated in FIG. 10A and the all recirculation mode illustrate in FIG. 12A may only be 2 units apart. The ideal solution (assuming the distance should be minimized) includes the FFCS modes as close as possible.

The method 300 ends at 400.

If false at 392, the method 300 determines whether every offset combination has been tested at 404. For example, in the at least one example embodiment discussed at 392, both offsets for $C_{3A}=C_{2A}+3$, 7 were tested.

If false at 404, the offset constant is set to a new combination at 408. The method 300 then returns to 388.

If true at 404, the method 300 determines whether every variant combination has been tested at 412. For example, the variant in FIG. 10A for the all fresh mode was selected to test, the variant in FIG. 11A for the two-layer mode was selected to test, and the variant in FIG. 12A for the all recirculation mode was selected to test (as previously discussed), every offset combination may not have been tested. The following additional combinations may still remain untested:

| | |
|---|---|
| FIG. 10A, FIG. 11B, FIG. 12A | FIG. 10B, FIG. 11A, FIG. 12A |
| FIG. 10A, FIG. 11C, FIG. 12A | FIG. 10B, FIG. 11B, FIG. 12A |
| FIG. 10A, FIG. 11D, FIG. 12A | FIG. 10B, FIG. 11C, FIG. 12A |
| FIG. 10A, FIG. 11A, FIG. 12B | FIG. 10B, FIG. 11D, FIG. 12A |
| FIG. 10A, FIG. 11B, FIG. 12B | FIG. 10B, FIG. 11A, FIG. 12B |
| FIG. 10A, FIG. 11C, FIG. 12B | FIG. 10B, FIG. 11B, FIG. 12B |
| FIG. 10A, FIG. 11D, FIG. 12B | FIG. 10B, FIG. 11C, FIG. 12B |
| | FIG. 10B, FIG. 11D, FIG. 12B |

| | |
|---|---|
| FIG. 10C, FIG. 11A, FIG. 12A | FIG. 10D, FIG. 11A, FIG. 12A |
| FIG. 10C, FIG. 11B, FIG. 12A | FIG. 10D, FIG. 11B, FIG. 12A |
| FIG. 10C, FIG. 11C, FIG. 12A | FIG. 10D, FIG. 11C, FIG. 12A |
| FIG. 10C, FIG. 11D, FIG. 12A | FIG. 10D, FIG. 11D, FIG. 12A |
| FIG. 10C, FIG. 11A, FIG. 12B | FIG. 10D, FIG. 11A, FIG. 12B |
| FIG. 10C, FIG. 11B, FIG. 12B | FIG. 10D, FIG. 11B, FIG. 12B |
| FIG. 10C, FIG. 11C, FIG. 12B | FIG. 10D, FIG. 11C, FIG. 12B |
| FIG. 10C, FIG. 11D, FIG. 12B | FIG. 10D, FIG. 11D, FIG. 12B |

If false at 412, the method 300 returns to 356 at 416.

If true at 412, the design is not valid at 420. There are no valid design using the tested combination. The method then ends at 400.

While the method 300 was discussed with reference to a looping ribbon design, method 300 is also applicable to a non-looping ribbon design. Now referring to FIG. 28, a schematic for at least one example embodiment for an FFCS door assembly 500 supported within a housing and having a door belt 518 with a non-looping ribbon design is illustrated. The door belt 518 may be spooled on each end 520, allowing the door belt 518 to move a finite amount in both directions. The door belt 518 may be divided into outlet sections 1-4, representing the outlets of the FFCS door assembly 500. For the purposes of keeping the given example simple, it is assumed that outlet sections 1-4 are of equal length with extra space only between outlet 2 and outlet 3. However, it is understood that this example embodiment could have sections of differing length or sections separated by extra space.

In the given example, there may be a single inlet 522 that provides fluid flow to outlets 526, 530, 534, and 538, corresponding to outlet sections 1-4, respectively. The various modes may be shown by the sections of the belt being open, closed, or either. As illustrated in the legend, the open sections are indicated by a dotted line, the closed sections are indicated by a solid line, and the outlet sections that may be either opened or closed are indicated by a hyphened line. While only a single inlet 522 is illustrated, it is understood that the single inlet is for simplicity and the FFCS door assembly 500 could have multiple inlets.

Figure 28:
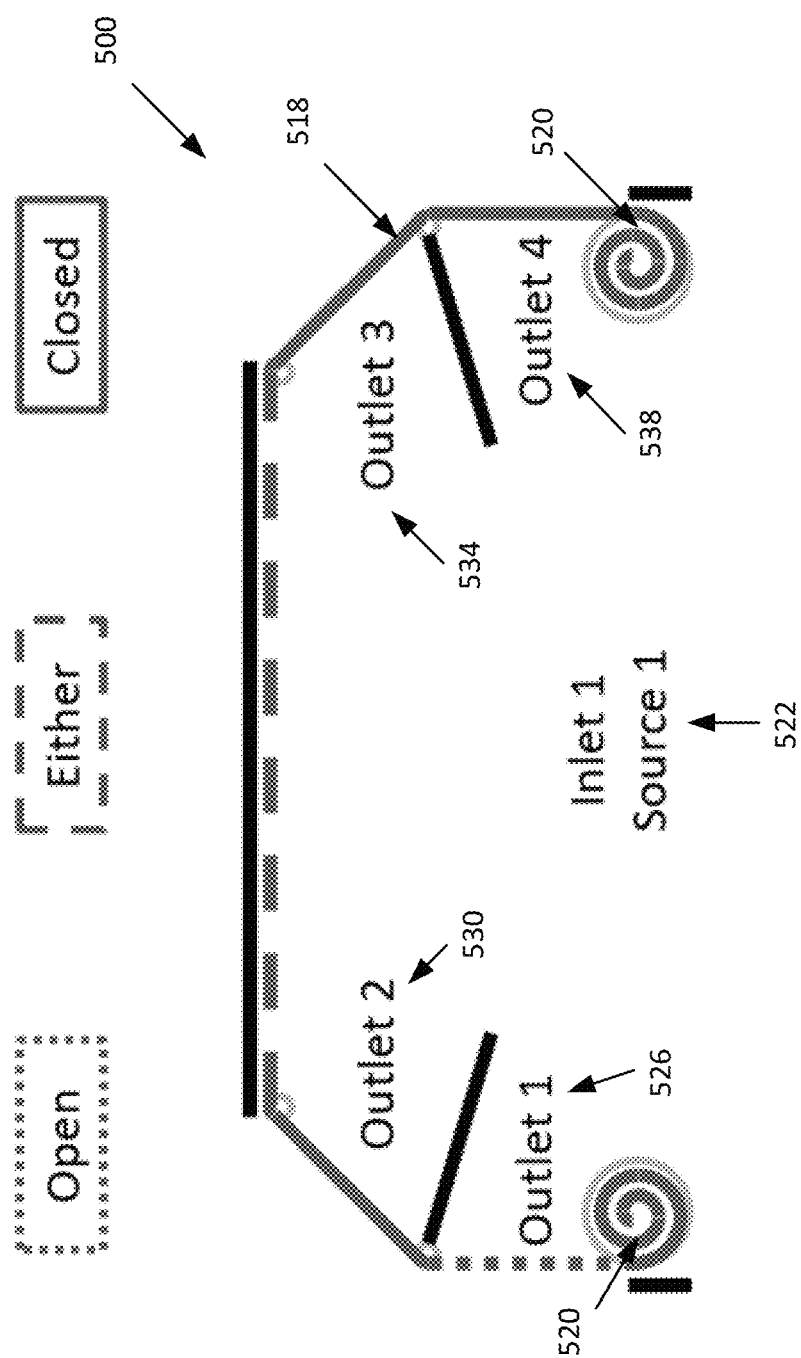
FIG. 28 is a schematic view of at least one example embodiment of an FFCS door assembly supported within a housing and having a door belt with a non-looping ribbon design according to the present disclosure.

In at least one example embodiment, the various FFCS modes for the schematic in FIG. 28 may be achieved as follows:

| % Open | Outlet 1 | Outlet 2 | Outlet 3 | Outlet 4 |
|---|---|---|---|---|
| Mode 1 | 100% | 0% | 0% | 0% |
| Mode 2 | 0% | 100% | 0% | 0% |
| Mode 3 | 0% | 0% | 100% | 0% |
| Mode 4 | 0% | 0% | 0% | 100% |
| Mode 5 | 0% | 50% | 50% | 0% |
| Mode 6 | 50% | 0% | 0% | 50% |

Figure 29A:
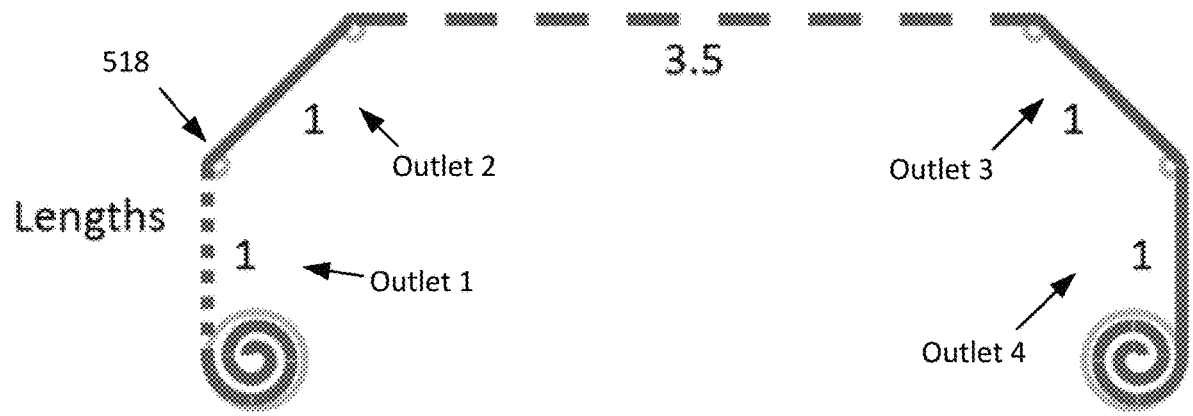
FIGS. 29A-29C are schematic views for the FFCS door assembly of FIG. 28 illustrating that when the outlet sections are not of the same length, are separated by extra space, or may be partially covered, the door belt may be further divided into subsections.
Figure 29B:
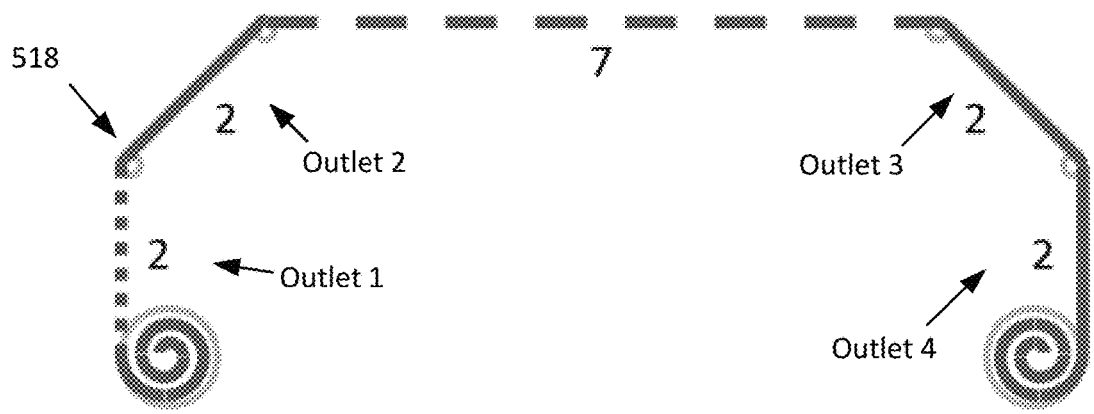
Figure 29C:
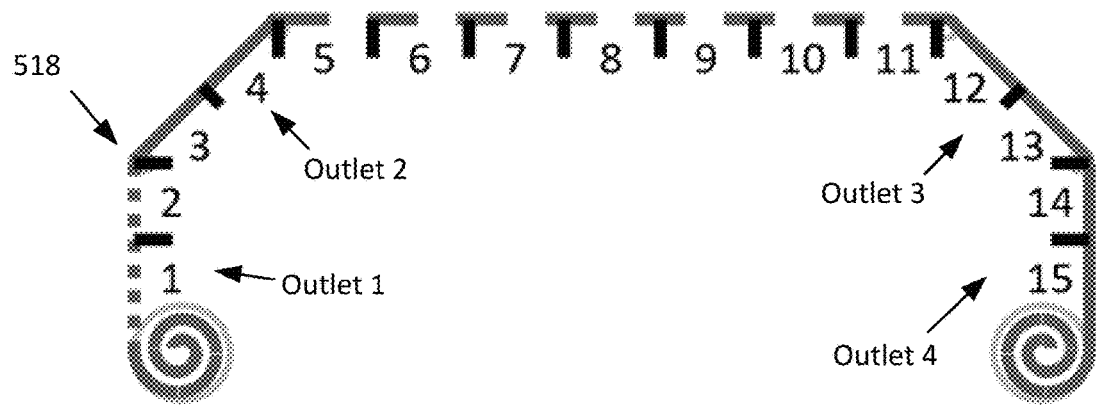

As illustrated in FIGS. 29A-29C, when the outlet sections are not of the same length (see FIGS. 29A and 29B), are separated by extra space, or may be partially covered, the door belt 518 may be further divided into subsections. For example, where outlets 2 and 3 are separated by extra space and where outlets 2 and 3 may be partially covered, the door belt 518 may be further divided into sections 1-15 (FIG. 29C).

Figure 30A:
FIGS. 30A-30F are schematic views of the FFCS door assembly of FIG. 28 illustrating various example embodiments of FFCS modes.

In at least one example embodiment, the various FFCS modes mentioned above are illustrated in FIGS. 30A-30F. As illustrated in FIG. 30A, mode 1 includes outlet 1 100% open, outlet 2 closed, outlet 3 closed, and outlet 4 closed. The outlets translate to sections 1-15, where sections 1 and 2 are open, sections 3, 4, 12, 13, 14, and 15 are closed, and sections 5, 6, 7, 8, 9, 10, and 11 may be either open or closed.

Figure 30B:
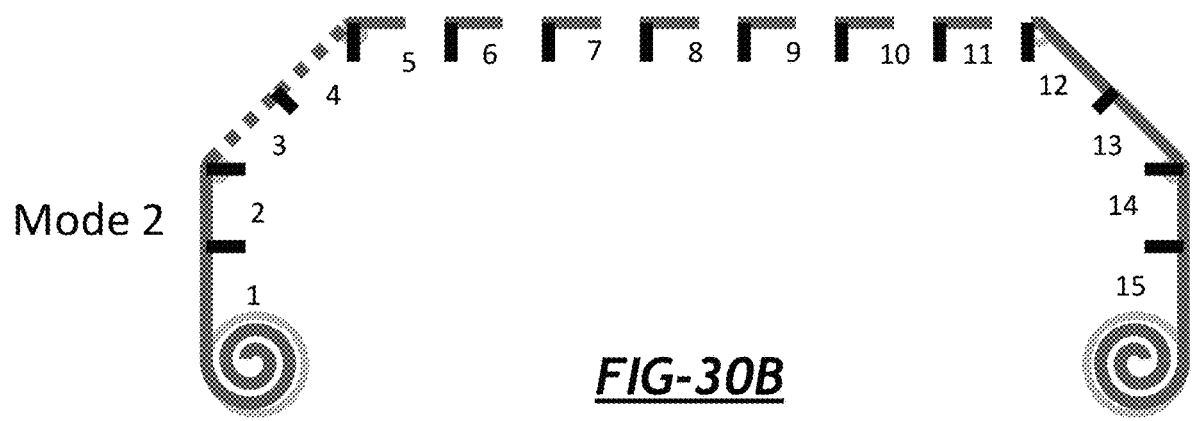

As illustrated in FIG. 30B, mode 2 includes outlet 1 closed, outlet 2 100% open, outlet 3 closed, and outlet 4 closed. The outlets translate to sections 1-15, where sections 1, 2, 12, 13, 14, and 15 are closed, sections 3 and 4 are open, and sections 5, 6, 7, 8, 9, 10, and 11 may be either open or closed.

Figure 30C:
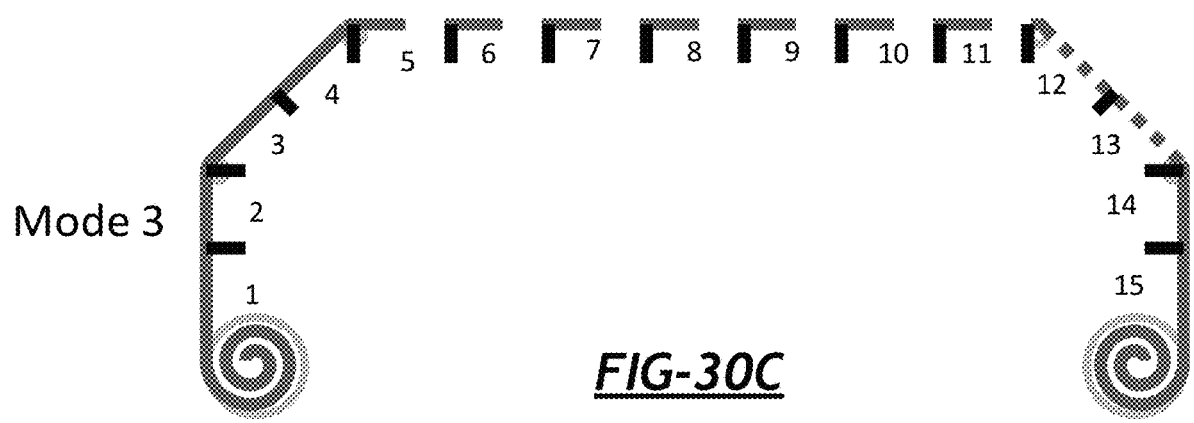

As illustrated in FIG. 30C, mode 3 includes outlet 1 closed, outlet 2 closed, outlet 3 100% open, and outlet 4 closed. The outlets translate to sections 1-15, where sections 1, 2, 3, 4, 14, and 15 are closed, sections 12 and 13 are open, and sections 5, 6, 7, 8, 9, 10, and 11 may be either open or closed.

Figure 30D:
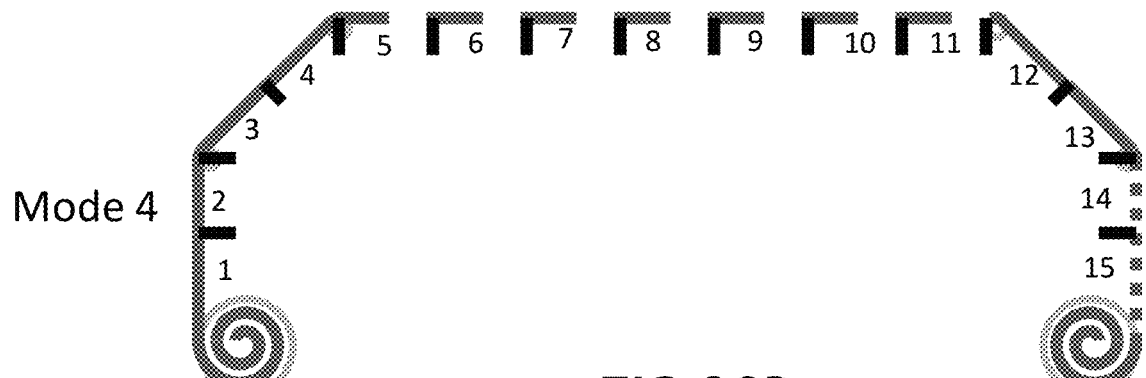

As illustrated in FIG. 30D, mode 3 includes outlet 1 closed, outlet 2 closed, outlet 3 closed, and outlet 4 100% open. The outlets translate to sections 1-15, where sections 1, 2, 3, 4, 12, and 13 are closed, sections 14 and 15 are open, and sections 5, 6, 7, 8, 9, 10, and 11 may be either open or closed.

Figure 30E:
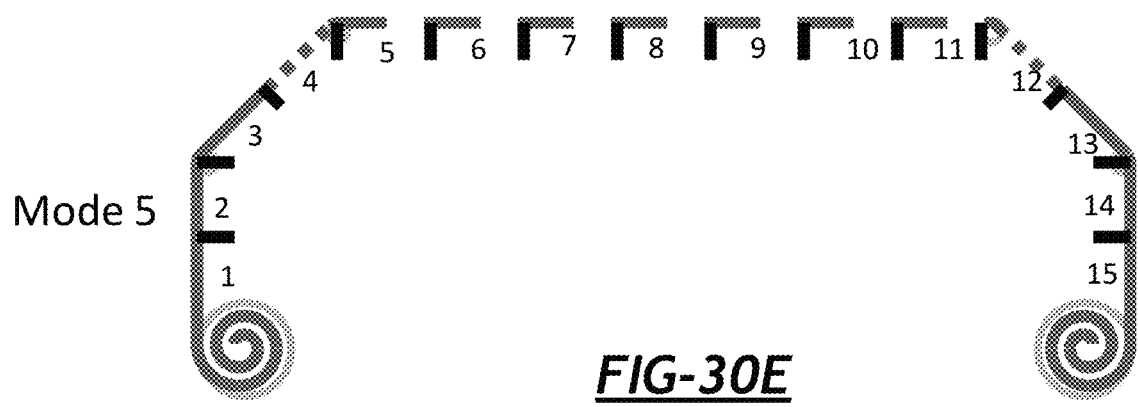

As illustrated in FIG. 30E, mode 5 includes outlet 1 closed, outlet 2 50% open, outlet 3 50% open, and outlet 4 closed. The outlets translate to sections 1-15, where sections 1, 2, 3, 13, 14, and 15 are closed, sections 4 and 12 are open, and sections 5, 6, 7, 8, 9, 10, and 11 may be either open or closed. Please note, alternatives to sections 4 and 12 being open and sections 3 and 13 being closed may be the following:

| | |
|---|---|
| Mode 5A | Sections 4 and 12 open; Sections 3 and 13 closed (as illustrated) |
| Mode 5B | Sections 4 and 13 open; Sections 3 and 12 closed |
| Mode 5C | Sections 3 and 12 open; Sections 4 and 13 closed |
| Mode 5D | Sections 3 and 13 open; Sections 4 and 12 closed |

Figure 30F:
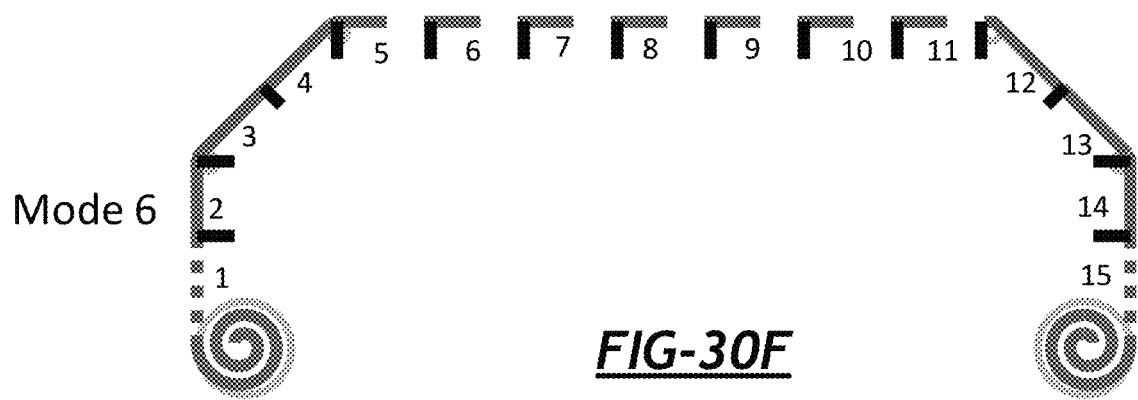

As illustrated in FIG. 30F, mode 6 includes outlet 1 50% open, outlet 2 closed, outlet 3 closed, and outlet 4 50% open. The outlets translate to sections 1-15, where sections 2, 3, 4, 12, 13, and 14 are closed, sections 1 and 15 are open, and sections 5, 6, 7, 8, 9, 10, and 11 may be either open or closed. Please note, alternatives to sections 1 and 15 being open and sections 2 and 14 being closed may be the following:

| | |
|---|---|
| Mode 6A | Sections 1 and 15 open; Sections 2 and 14 closed (as illustrated) |
| Mode 6B | Sections 4 and 14 open; Sections 3 and 15 closed |
| Mode 6C | Sections 3 and 15 open; Sections 4 and 14 closed |
| Mode 6D | Sections 3 and 14 open; Sections 4 and 15 closed |

For simplification purposes going forward, modes 1, 2, 3, 4, and 5A-5D will be considered. However, it is understood that modes 6A-6D (or any other modes) may be factored in similarly. Accordingly, the patterns for modes 1-4 and 5A-5D may be as follows, where 1 is closed, −1 is open, and 0 is either open or closed:

| Mode | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | −1 | −1 | 1 | 1 | 0 | 0 | 0 | 0 | 0 | 0 | 0 | 1 | 1 | 1 | 1 |
| 2 | 1 | 1 | −1 | −1 | 0 | 0 | 0 | 0 | 0 | 0 | 0 | 1 | 1 | 1 | 1 |
| 3 | 1 | 1 | 1 | 1 | 0 | 0 | 0 | 0 | 0 | 0 | 0 | −1 | −1 | 1 | 1 |
| 4 | 1 | 1 | 1 | 1 | 0 | 0 | 0 | 0 | 0 | 0 | 0 | 1 | 1 | −1 | −1 |
| 5A | 1 | 1 | 1 | −1 | 0 | 0 | 0 | 0 | 0 | 0 | 0 | −1 | 1 | 1 | 1 |
| 5B | 1 | 1 | 1 | −1 | 0 | 0 | 0 | 0 | 0 | 0 | 0 | 1 | −1 | 1 | 1 |
| 5C | 1 | 1 | −1 | 1 | 0 | 0 | 0 | 0 | 0 | 0 | 0 | −1 | 1 | 1 | 1 |
| 5D | 1 | 1 | −1 | 1 | 0 | 0 | 0 | 0 | 0 | 0 | 0 | 1 | −1 | 1 | 1 |

While the table above shows mode 5 with four variants, the opening for outlet 2 may be anywhere between the positions shown in modes 5A and 5C. The same is true for outlet 3 and the positions shown in modes 5A and 5B. As a result, mode 5 actually has infinity (∞) mode variants. The validation equation may be applied as shown in FIG. 31. As previously stated, unlike a looping belt where length (L) is equal to the path length (n), in the non-looping belt, L=n*(2ω−1). Here the mode variant combinations are as follows:

$$1 + 2 + 3 + 4 + 5A$$
$$1 + 2 + 3 + 4 + 5B$$
$$1 + 2 + 3 + 4 + 5C$$
$$1 + 2 + 3 + 4 + 5D$$

Since mode 5 has outlets that are some amount between 0% and 100% open, the mode variations would be able to include any pattern where the ranges of 2>x>5 and 11>x>14 results in a 50% open (this would also be true if referring to inlets). The size of the openings that make the 50% can be scaled by changing the size of the unit distance used for x.

Referring to FIG. 32, the results may be determined to be valid. Since there is not a finite number of modes, the constants may be expressed as a range constraint instead of a finite number, as shown in the table below:

$$C_1 = [0:120]$$
$$C_2 = C_1 + [-60{:}-13, -7{:}-2, 2{:}9, 15{:}60]$$
$$C_3 = C_1 + [-60{:}-4, 4{:}7, 11, 15{:}60]$$
$$C_3 = C_2 + [-60{:}-4, 2{:}9, 13{:}60]$$
$$C_4 = C_1 + [-60{:}-2, 4{:}9, 13{:}60]$$
$$C_4 = C_2 + [-60{:}-4, 4{:}7, 11, 15{:}60]$$
$$C_4 = C_3 + [-60{:}-13, -7{:}-2, 2{:}9, 15{:}60]$$
$$C_A = C_1 + [-60{:}-12, -7{:}-4, 3{:}7, 10, 15{:}60]$$
$$C_A = C_2 + [-60{:}-12, -7{:}-4, 1, 4{:}8, 13{:}60]$$
$$C_A = C_3 + [-60{:}-13, -8{:}-4, -1, 4{:}7, 12{:}60]$$
$$C_A = C_4 + [-60{:}-15, -10, -7{:}-3, 4{:}7, 12{:}60]$$
$$C_B = C_1 + [-60{:}-12, -7{:}-3, 3{:}8, 15{:}60]$$
$$C_B = C_2 + [-60{:}-12, -7{:}-4, 4{:}7, 13{:}60]$$
$$C_B = C_3 + [-60{:}-13, -8{:}-3, 4{:}8, 13{:}60]$$
$$C_B = C_4 + [-60{:}-15, -10, -7{:}-4, 4{:}8, 13{:}60]$$
$$C_C = C_1 + [-60{:}-13, -8{:}-4, 4{:}7, 10, 15{:}60]$$
$$C_C = C_2 + [-60{:}-13, -8{:}-4, 3{:}8, 13{:}60]$$
$$C_C = C_3 + [-60{:}-13, -7{:}-4, 4{:}7, 12{:}60]$$
$$C_C = C_4 + [-60{:}-15, -8{:}-3, 3{:}7, 12{:}60]$$
$$C_D = C_1 + [-60{:}-13, -8{:}-3, 4{:}8, 15{:}60]$$
$$C_D = C_2 + [-60{:}-13, -8{:}-4, 3{:}7, 13{:}60]$$
$$C_D = C_3 + [-60{:}-13, -7{:}-3, 4{:}8, 13{:}60]$$
$$C_D = C_4 + [-60{:}-15, -8{:}-4, 3{:}8, 13{:}60]$$

Referring to FIG. 33, the most efficient solution may be a length of 21. The valid design is an expression of the validation equation, with modes 1, 2, 3, 4, and 5A and offset constants. In at least one example embodiment, the validation equation includes inputs of constants $C_1=0$, $C_2=2$, $C_3=4$, $C_4=6$, $C_A=3$ for the most efficient solution.

While the previous examples applied only a looping ribbon design or a non-looping ribbon design, it is understood that a looping ribbon design may be applied in conjunction with a non-looping ribbon design. In at least one example embodiment, a multi ribbon design may contain as many door belts (looping ribbons and/or non-looping ribbons) as needed to achieve the desired FFCS modes. The only requirements are that each door belt has a fixed starting point, the units of each door belt are scaled based on the rate of travel of the door belt relative to a control door belt (control ribbon), and a common offset must be used for all door belts for each FFCS mode.

Figure 34:
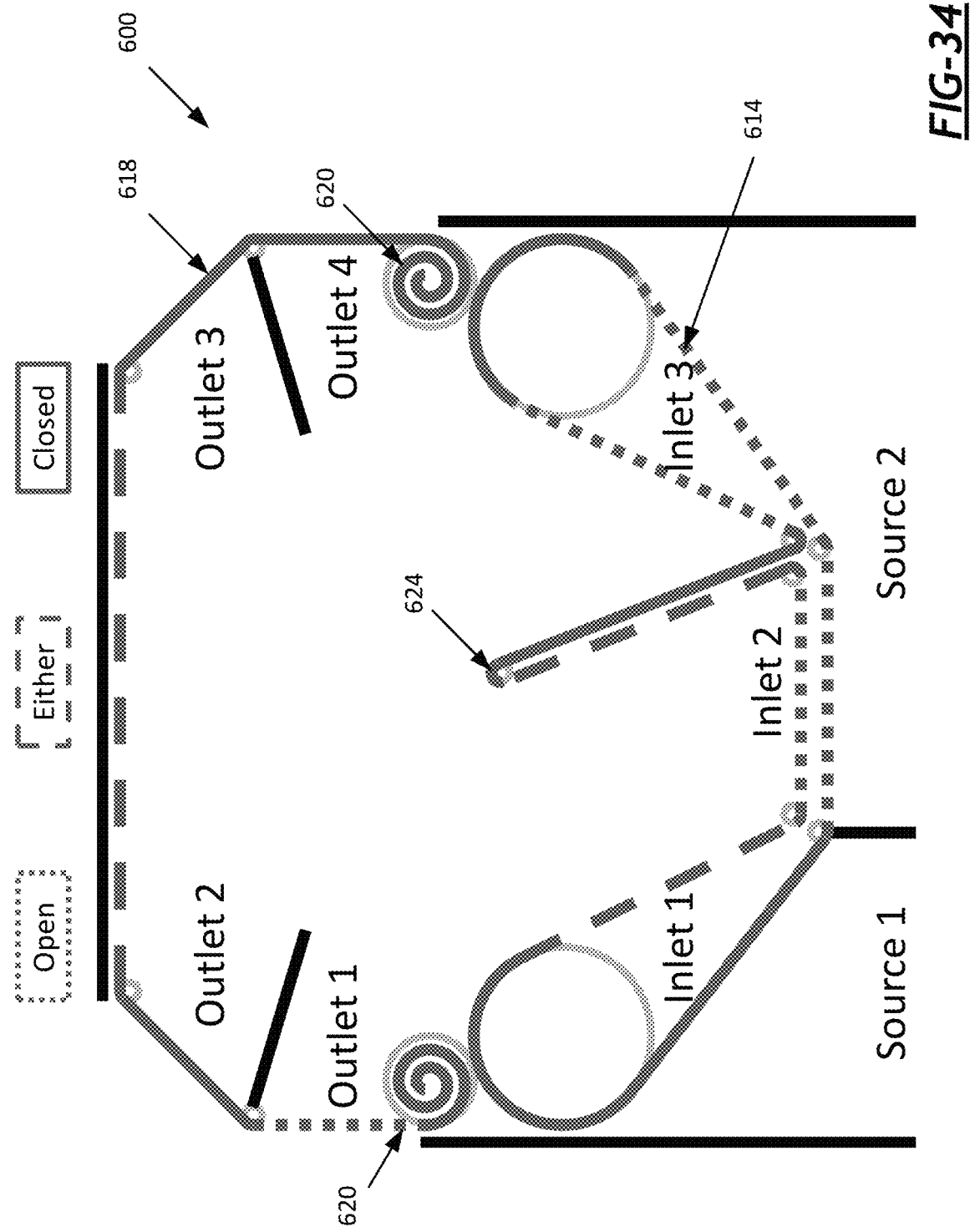
FIG. 34 is a schematic of at least one example embodiment for an HVAC door assembly supported within a housing and having a first door belt with a looping ribbon design and a second door belt with a non-looping ribbon design according to the present disclosure.

Now referring to FIG. 34, a schematic for at least one example embodiment for an FFCS door assembly 600 supported within a housing and having a first door belt 614 with a looping ribbon design and a second door belt 618 with a non-looping ribbon design is illustrated. The door belt 618 may be the same as the door belt 518. The door belt 618 may be spooled on each end 620, allowing the door belt 618 to move a finite amount in both directions. In at least one example embodiment, the door belt 618 may be divided into outlets 1-4, representing the outlets of the FFCS door assembly 600. For the purposes of keeping the given example simple, it is assumed that outlets 1-4 are of equal length with extra space only between outlet 2 and outlet 3. However, it is understood that this example embodiment could have sections of differing length or sections separated by extra space.

The door belt 614 may be the same as, or similar to, door belt 18. In at least one example embodiment, the door belt 614 may be divided into inlets 1-3, representing the inlets of the FFCS door assembly 600. Inlets 1-3 may receive fluid flow from sources 1 and 2. For example only, inlet 1 may receive fluid flow from source 1, and inlet 2 and inlet 3 may receive fluid flow from source 2. In at least one example embodiment, source 1 may be a fresh air channel, and source 2 may be a recirculation air channel. While inlets 1-3 and sources 1 and 2 are illustrated and described, it is understood that the present disclosure applies to any number of inlets and sources.

Additionally, the door belt 614 may include a rib 624 as a looping section extending to the center of the FFCS door assembly 600. Rib 624 may be utilized to influence flow mixtures for FFCS door assembly 600. For the purposes of keeping the given example simple, it is assumed that inlets 1-3 and rib 624 are of equal length with no extra space in between. However, it is understood that this example embodiment could have sections of differing length or sections separated by extra space.

In at least one example embodiment, the various FFCS modes may be shown by the sections of the door belts 614, 618 being open, closed, or either. As illustrated in the legend, the open sections are indicated by a dotted line, the closed sections are indicated by a solid line, and the outlet sections that may be either opened or closed are indicated by a hyphened line. While three inlets and four outlets are illustrated, it is understood that the FFCS door assembly could have any number of inlets and any number of outlets.

In at least one example embodiment, the various FFCS modes for the schematic in FIG. 34 may be achieved as follows:

| | % Open | | | | | |
|---|---|---|---|---|---|---|
| | Source 1 | Source 2 | Outlet 1 | Outlet 2 | Outlet 3 | Outlet 4 |
| Mode 1 | 0% | 100% | 100% | 0% | 0% | 0% |
| Mode 2 | 100% | 0% | 0% | 100% | 0% | 0% |
| Mode 3 | 100% | 100% | 0% | 50% | 50% | 0% |
| Mode 4 | 0% | 100% | 0% | 0% | 100% | 0% |
| Mode 5 | 100% | 0% | 0% | 0% | 0% | 100% |

Figure 35:
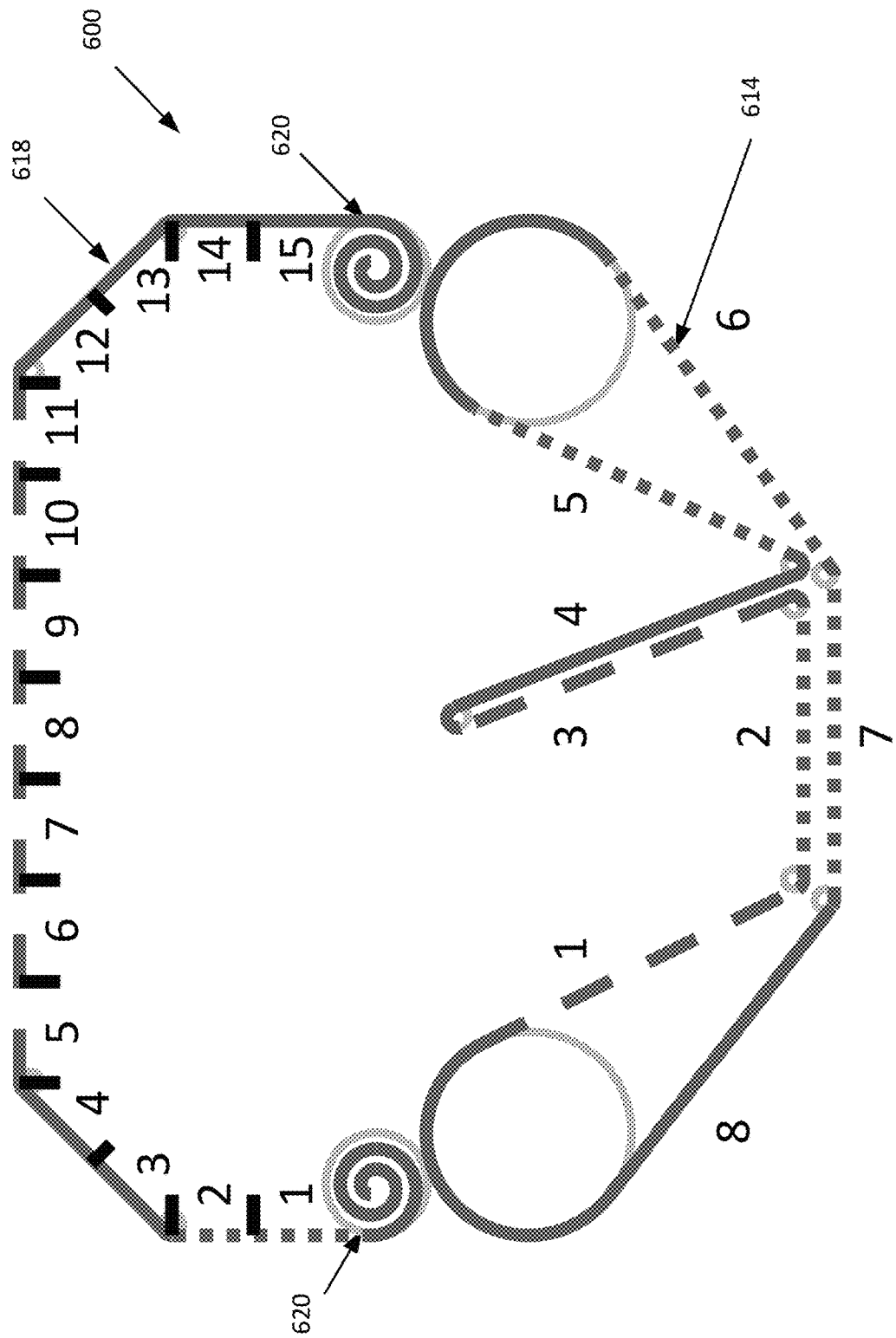
FIG. 35 is a schematic of the HVAC door assembly in FIG. 34 with the second door belt subdivided into sections 1-15 and the first door belt subdivided into sections 1-8.

Now referring to FIG. 35, the door belt 618 may be subdivided into sections 1-15 and door belt 614 may be subdivided into sections 1-8. In a multi ribbon design, as illustrated, one ribbon is set as the control ribbon. All other ribbons are oriented and scaled relative to the control ribbon. If there is a non-looping ribbon, such as door belt 618, in the multi ribbon design, the non-looping ribbon is set to the control ribbon. For example, the door belt 618 in FIG. 35 is set to the control ribbon.

In at least one example embodiment, a direction of travel is set as the positive x direction for the door belt 618 (as the control ribbon). A positive x direction for the door belt 614 (i.e., all other ribbons) is determined by the direction of travel for the door belt 614 when the door belt 618 travels in the positive x direction. For example, the door belt 614 moves clockwise when the door belt 618 moves in the positive x direction.

In at least one example embodiment, non-looping ribbons, such as door belt 614, must have the same length (L), once the non-looping ribbons are scaled to a common size. The common length (L) ensures all door belts are able to reach full travel. Otherwise, one door belt would reach its end before another door belt.

Now referring to FIG. 36, a common scale for units distance of x is established by selecting a door belt to which all other door belts will be converted. For example, the door belt 614 will be converted to the units distance for door belt 618, since door belt 618 is the control ribbon. Door belt 614 is converted by multiplying the units distance x by the rate of travel of the door belt 618 (control ribbon) and the answer is divided by the rate of travel of the door belt 614 (target ribbon).

$$Units_{Control} = Units_{Target} * \left(\frac{RoT_{Control}}{RoT_{Target}}\right)$$

$$Scale = \left(\frac{Seg_{Length_{Control}}}{Seg_{Length_{Target}}}\right)$$

For example only, if a distance of x for the looping ribbon (i.e., the door belt 614) is equal to 50 mm, and a distance of x for the non-looping ribbon (i.e., the door belt 618) is equal to 30 mm, then the conversion will be ⅗.

Now referring to FIG. 37, with a common starting point set for each door belt, the offset can be determined using the same methods as previously described. First, for each FFCS mode, a ribbon design variant for each door belt must be selected. The ribbon design variants are grouped by FFCS modes so that each FFCS mode group has one design variant from each door belt. If a solution is valid, then the design variants of each FFCS mode group will have a common offset.

For the given example, it is noted that the previously described embodiments of FIGS. 9-33 have been combined, and, as such, the previous description applies. However, since the x direction of door belt 614 (i.e., the example of FIGS. 9-27—the looping ribbon) has been reversed, the solution directions previously described must also be reversed. Thus, while modes 1-5A of the non-looping ribbon will match the previously described example in FIGS. 28-33, modes 1B, 2A, and 3A from the previously described example in FIGS. 9-27 are reversed. The following is thus true:

| FFCS Mode = | Looping (Door Belt 614) | Non-Looping (Door Belt 618) |
|---|---|---|
| Mode 1 | Mode 3A | Mode 1 |
| Mode 2 | Mode 1B | Mode 2 |
| Mode 3 | Mode 2A | Mode 5A |
| Mode 4 | Mode 3A | Mode 3 |
| Mode 5 | Mode 1B | Mode 4 |

Now referring to FIG. 38, the most efficient solution may be a length of 21. In at least one example embodiment, the analysis previously described with respect to FIGS. 31 and 32 is performed to determine the most efficient solution. The valid design is an expression of the validation equation, with modes 1, 2, 3, 4, and 5 and offset constants. In at least one example embodiment, the validation equation includes inputs of constants $C_1=0$, $C_2=2$, $C_3=3$, $C_4=4$, $C_5=6$ for the most efficient solution.

Now referring to FIG. 39, the result for each ribbon with the applied constants is zero (0), so the sum of all ribbon results is 0. Therefore, this is a valid ribbon design.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A Fluid Flow Control System (FFCS) door assembly comprising:
 a continuous belt; and
 a plurality of rollers supporting the continuous belt and defining a first segment, a second segment, a third segment, and a fourth segment;
 wherein:
  the continuous belt includes a plurality of openings that selectively allow fluid flow to pass through the first segment, the second segment, the third segment, and the fourth segment when two openings of the plurality of openings align with the first segment, the second segment, the third segment, or the fourth segment;
  the first segment aligns with a fresh air channel and a first output channel; and
  the third segment aligns with a first recirculation air channel and a second output channel.

2. The FFCS door assembly of claim 1, further comprising a frame supporting the plurality of rollers and including a track on which the continuous belt moves.

3. The FFCS door assembly of claim 1, further comprising a single motor driving one of the plurality of rollers to move the continuous belt.

4. The FFCS door assembly of claim 1, further comprising a casing housing the continuous belt and the plurality of rollers.

5. The FFCS door assembly of claim 4, further comprising a filter fixed within a window of the casing and aligning with the first segment.

6. The FFCS door assembly of claim 1, further comprising a filter.

7. The FFCS door assembly of claim 1, further comprising:
a rack fixed for movement with the continuous belt; and
a hard stop engaging with the rack and being configured to stop movement of the rack and the continuous belt upon contact with a wall.

8. The FFCS door assembly of claim 1, wherein the second segment aligns with a second recirculation air channel and the first output channel, and the fourth segment separates the first output channel from the second output channel.

9. The FFCS door assembly of claim 8, wherein during an all fresh heating, ventilation, and air conditioning (HVAC) mode, the two openings of the plurality of openings aligns with the first segment to permit airflow communication between the fresh air channel and the first output channel, and an additional two openings of the plurality of openings aligns with the fourth segment to permit airflow communication between the first output channel and the second output channel.

10. The FFCS door assembly of claim 9, wherein during the all fresh HVAC mode, the continuous belt blocks airflow to the second segment, preventing airflow communication between the second recirculation air channel and the first output channel, and the continuous belt blocks airflow to the second segment, preventing airflow communication between the first recirculation air channel and the second output channel.

11. The FFCS door assembly of claim 8, wherein during an all recirculation HVAC mode, the two openings of the plurality of openings aligns with the second segment to permit airflow communication between the second recirculation air channel and the first output channel, and an additional two openings of the plurality of openings aligns with the third segment to permit airflow communication between the first recirculation air channel and the second output channel.

12. The FFCS door assembly of claim 11, wherein during the all recirculation HVAC mode, the continuous belt blocks airflow to the first segment, preventing airflow communication between the fresh air channel and the first output channel, and the continuous belt blocks airflow to the fourth segment, preventing airflow communication between the first output channel and the second output channel.

13. The FFCS door assembly of claim 8, wherein during a two-layer HVAC mode, the two openings of the plurality of openings aligns with the first segment to permit airflow communication between the fresh air channel and the first output channel, and an additional two openings of the plurality of openings aligns with the third segment to permit airflow communication between the first recirculation air channel and the second output channel.

14. The FFCS door assembly of claim 13, wherein during the two-layer HVAC mode, the continuous belt blocks airflow to the second segment, preventing airflow communication between the second recirculation air channel and the first output channel, and the continuous belt blocks airflow to the fourth segment, preventing airflow communication between the first output channel and the second output channel.

15. The FFCS door assembly of claim 1, wherein the second segment aligns with a second recirculation air channel and the first output channel.

16. A heating, ventilation, and air conditioning (HVAC) system comprising:
a package housing a fresh air channel, a first recirculation air channel, a second recirculation air channel, a first output channel, and a second output channel; and
an HVAC door separating the fresh air channel, the first recirculation air channel, and the second recirculation air channel from the first output channel and the second output channel,
the HVAC door including
a continuous belt, and
a plurality of rollers supporting the continuous belt and defining a first segment, a second segment, a third segment, and a fourth segment, the first segment aligning with the fresh air channel and the first output channel, the second segment aligning with the first recirculation air channel and the first output channel, the third segment aligning with the second recirculation air channel and the second output channel, and the fourth segment separating the first output channel and the second output channel,
the continuous belt having a plurality of openings that selectively allow airflow to pass through the first segment, the second segment, the third segment, and the fourth segment when two openings of the plurality of openings align with the first segment, the second segment, the third segment, or the fourth segment.

17. A Fluid Flow Control System (FFCS) door assembly comprising:
a continuous belt; and
a plurality of rollers supporting the continuous belt and defining a first segment, a second segment, a third segment, and a fourth segment;
wherein:
the continuous belt includes a plurality of openings that selectively allow fluid flow to pass through the first segment, the second segment, the third segment, and the fourth segment when two openings of the plurality of openings align with the first segment, the second segment, the third segment, or the fourth segment;
the third segment aligns with a first recirculation air channel and a first output channel; and
the first segment aligns with a fresh air channel and a second output channel.

18. The FFCS door assembly of claim 17, the fourth segment separates the first output channel from the second output channel.

* * * * *